(12) United States Patent
Matthews et al.

(10) Patent No.: US 10,523,576 B1
(45) Date of Patent: Dec. 31, 2019

(54) HIGH-PERFORMANCE GARBAGE COLLECTION IN A NETWORK DEVICE

(71) Applicant: Innovium, Inc., San Jose, CA (US)

(72) Inventors: William Brad Matthews, San Jose, CA (US); Puneet Agarwal, Cupertino, CA (US); Ajit Kumar Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 0 days.

(21) Appl. No.: 16/029,441

(22) Filed: Jul. 6, 2018

Related U.S. Application Data

(60) Provisional application No. 62/665,955, filed on May 2, 2018.

(51) Int. Cl.
| | |
|---|---|
| *H04L 12/50* | (2006.01) |
| *H04L 12/891* | (2013.01) |
| *H04L 12/815* | (2013.01) |
| *H04L 12/861* | (2013.01) |
| *H04L 12/883* | (2013.01) |
| *H04L 12/823* | (2013.01) |

(52) U.S. Cl.
CPC ............ *H04L 47/41* (2013.01); *H04L 47/22* (2013.01); *H04L 47/32* (2013.01); *H04L 49/9015* (2013.01); *H04L 49/9047* (2013.01); *H04L 49/9089* (2013.01)

(58) Field of Classification Search
None
See application file for complete search history.

(56) References Cited

U.S. PATENT DOCUMENTS

| | | | |
|---|---|---|---|
| 2003/0095558 A1* | 5/2003 | Chung | H04L 47/623 370/417 |
| 2003/0120884 A1* | 6/2003 | Koob | G06F 5/065 711/170 |
| 2005/0025140 A1* | 2/2005 | Deforche | H04L 47/34 370/363 |

* cited by examiner

*Primary Examiner* — Kouroush Mohebbi
(74) *Attorney, Agent, or Firm* — Wong & Rees LLP; Karl T. Rees

(57) ABSTRACT

Efficient garbage collection techniques for network packets and other units of data are described. Constituent portions of a data unit are stored in buffer entries spread out across multiple distinct banks. Linking data is generated and stored on a per-bank basis. The linking data defines, for each bank in which data for the data unit is stored, a chain of all entries in that bank that store data for the data unit. When the data unit is dropped or otherwise disposed of, a chain's head entry address may be placed in a garbage collection list for the corresponding bank. A garbage collector uses the linking data to gradually follow the chain of entries for the given bank, and frees each entry in the chain along the way. Optionally, certain addresses in the chain, including each chain's tail address, are immediately freed for the corresponding bank, without waiting to follow the chain.

20 Claims, 14 Drawing Sheets

HIGH-PERFORMANCE GARBAGE COLLECTION IN A NETWORK DEVICE

PRIORITY CLAIM

This application claims benefit under 35 U.S.C. § 119(e) of Provisional Application No. 62/665,955, filed May 2, 2018, the entire contents of which is hereby incorporated by reference as if fully set forth herein.

TECHNICAL FIELD

Embodiments relate generally to data buffering, and, more specifically, to techniques for managing the utilization of buffers within a network device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A computer network is a set of computing components interconnected by communication links. Each computing component may be a separate computing device, such as, without limitation, a hub, switch, bridge, router, server, gateway, or personal computer, or a component thereof. Each computing component, or "network device," is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer, such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged in to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A given node in the network may communicate with another node in the network by sending data units along one or more different "paths" through the network that lead to the other node, each path including any number of intermediate nodes. The transmission of data across a computing network typically involves sending units of data, such as packets, cells, or frames, along paths through intermediary networking devices, such as switches or routers, that direct or redirect each data unit towards a corresponding destination.

While a data unit is passing through an intermediary networking device—a period of time that is conceptualized as a "visit" or "hop"—the device may perform any of a variety of actions, or processing steps, with the data unit. The exact set of actions taken will depend on a variety of characteristics of the data unit, such as metadata found in the header of the data unit, and in many cases the context or state of the network device. For example, address information specified by or otherwise associated with the data unit, such as a source address, destination address, or path information, is typically used to determine how to handle a data unit (i.e. what actions to take with respect to the data unit). For instance, an Internet Protocol ("IP") data packet may include a destination IP address field within the header of the IP data packet, based upon which a network router may determine one or more other networking devices, among a number of possible other networking devices, to forward the IP data packet to.

In these and other contexts, a network device or other computing device often needs to temporarily store data in one or more memories or other storage media until resources become available to process the data. The storage media in which such data is temporarily stored is often logically and/or physically divided into discrete regions or sections referred to as data buffers (or, simply, "buffers"), and the act of temporarily storing data in these locations is generally referred to as "buffering." The rules and logic utilized to determine which data to buffer in which locations is a significant system design concern having a variety of technical ramifications, including without limitation the amount of storage media needed to implement buffers, the speed of that media, how that media is interconnected with other system components, and/or the manner in the buffered data is queued and processed.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
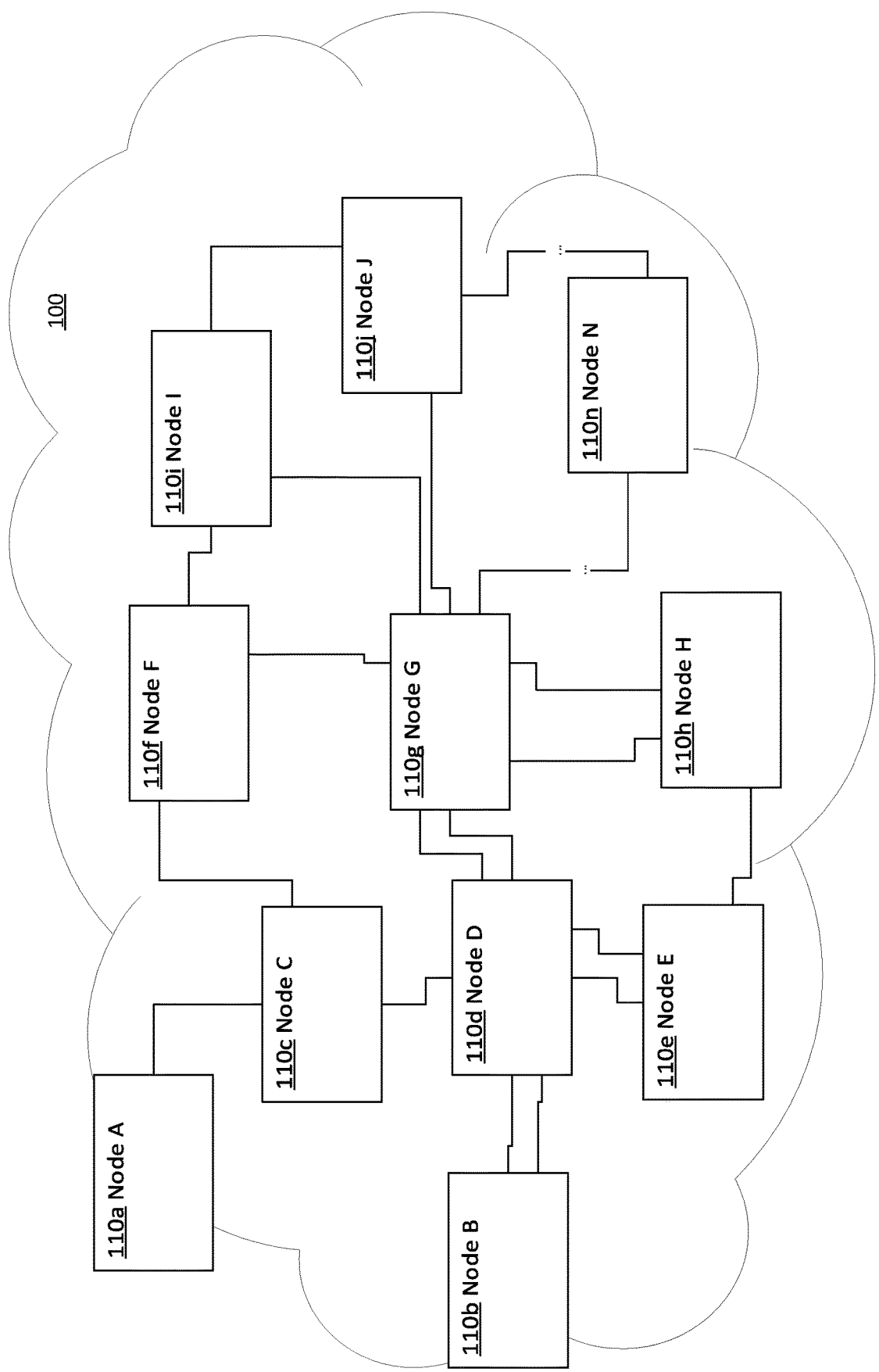
FIG. 1 is an illustrative view of various aspects of an example networking system in which the techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Data Units
2.2. Traffic Manager and Packet Processing
2.3. Buffers
2.4. Queues
2.5. Packet Metadata
2.6. Buffer Accounting
2.7. Garbage Collection
2.8. Miscellaneous
3.0. Functional Overview
3.1. Buffering Packet Data
3.2. Responding to Drop Event
3.3. Background Garbage Collection of Packet Data
4.0. Example Garbage Collection of Dropped Packet
5.0. Example Embodiments
6.0. Example Implementing System
6.1. Network Packets
6.2. Network Paths
6.3. Network Device
6.4. Ports
6.5. Packet Processors
6.6. Buffers
6.7. Queues
6.8. Egress Traffic Management
6.9. Arbitrator
6.10. Accounting Mechanisms
6.11. Garbage Collectors
6.12. Miscellaneous
7.0. Implementation Mechanism—Hardware Overview
8.0. Extensions and Alternatives 1.0. General Overview Approaches, techniques, and mechanisms are disclosed for improving the efficiency of garbage collection for network packets and other units of data. Constituent portions of a data unit, such as the cells or frames of a packet, are stored in buffer entries spread out across multiple distinct memory structures referred to as banks. As the constituent portions are assigned to and stored in the various buffer entries, linking data is generated and stored on a per-bank basis. Among other aspects, the linking data defines, for each bank in which data for the data unit is stored, a chain of all entries within that bank that currently store data for the data unit. The addresses of the head entries for each of these chains is stored in a readily accessible location.

When the data unit is dropped or otherwise disposed of, the address of the head entry for a given bank's chain may be placed in a special garbage collection list for the corresponding bank. Each bank has its own separate garbage collection list, which is monitored by a garbage collector. At times when the memory storing the linking data for a given bank is not being utilized for other operations, the garbage collector uses the linking data to gradually follow the chain of entries for the given bank, starting from the queued head entry, and frees each entry in the chain along the way. The entries thereby become available to store data for other data units.

In an embodiment, following a chain of entries comprises reading the head address of the chain from a garbage collection list, reading next-entry linking data associated with that head address to locate the next entry in the chain, adding the head address to a list of free entries for the corresponding bank, and replacing the head address in the garbage collection list with the address of the next entry.

According to an embodiment, the addresses of the current tail entries for each chain are also tracked in a readily accessible location. When a data unit is dropped or otherwise disposed of, the tail addresses of each of its chains are immediately added to corresponding lists of free entries for the corresponding banks. Hence, rather than waiting for the rest of a chain to be processed, the tail entry of a chain is freed immediately, since it is not associated with any linking data necessary to locate other entries in the chain. Alternatively, the tail address may instead be added to the special garbage collection list, or to a different garbage collection list.

In an embodiment, counting metadata for the data unit is copied, linked, or otherwise associated with each of its chains in the special garbage collection lists. This counting metadata includes identifiers for one or more logical entities with which the data unit is associated, such as a source port, queue, or priority set identifier. Each entity is associated with one or more global or per-bank counters, indicating an amount of buffer space currently utilized to store data associated with that entity. When freeing an entry in a chain, the entity or entities associated with the data unit are read from the associated counting metadata, and their corresponding counters are decremented an amount commensurate with the newly freed buffer entry.

In an embodiment, the garbage collector may be configured to process multiple chains concurrently. For example, the garbage collector may process garbage collection lists for each bank in parallel. As a consequence, chains for the same packet stored in different banks may be freed in parallel, resources permitting. Moreover, multiple chains within the same bank, for different packets, may be processed concurrently on a staggered basis.

In an embodiment, each bank has certain input/output (I/O) access limitations. For instance, the linking data for a bank may be stored in a single-ported or double-ported memory that can only be accessed once (or twice) each clock cycle.

In an embodiment, the linking data may serve other purposes aside from garbage collection. For instance, the linking data may be utilized to efficiently send or assemble a data unit from the buffers when needed. Among other aspects, the linking data may make it possible to more efficiently process the contents of a data unit whose contents are scattered amongst multiple access-limited memories. For instance, instead of waiting to sequentially access each portion of a data unit one-by-one from different banks that may be potentially locked for other operations, chains of entries storing non-sequential data for the data unit may be accessed from a given bank in rapid succession without waiting for access to information from other banks. The linking data may include a variety of other data, such as data indicating the position of a given portion of a data unit within that data unit, so that the entries may be re-arranged in their correct order as needed. In an embodiment, the techniques described herein further leverage such linking data for the purposes of garbage collection.

In other aspects, the inventive subject matter encompasses computer apparatuses and/or computer-readable media configured to carry out the foregoing techniques.

2.0. Structural Overview

Figure 3:
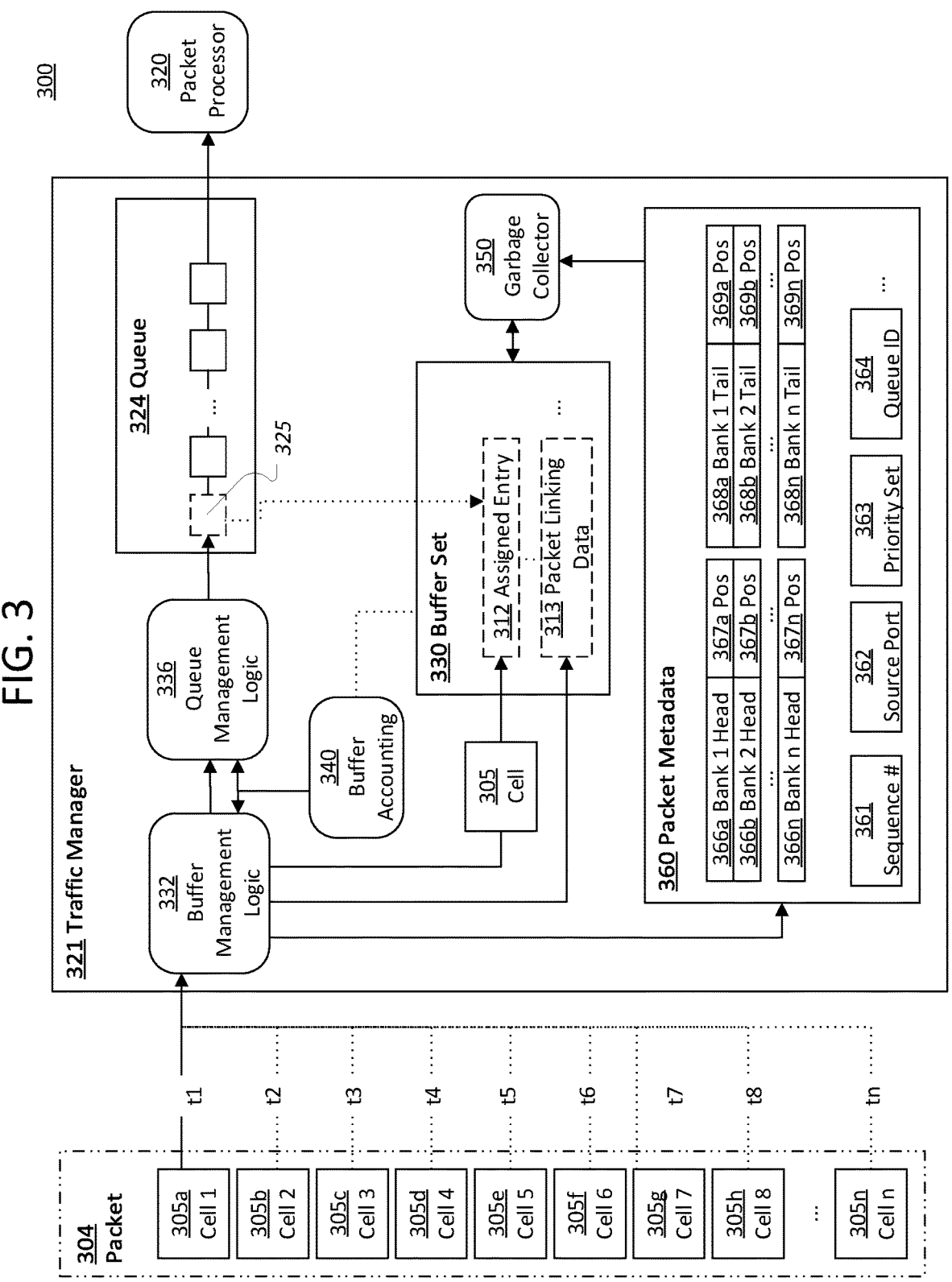
FIG. 3 is an illustrative view of various aspects of an example system in which techniques described herein may be practiced.

FIG. 3 is an illustrative view of various aspects of an example system 300 in which techniques described herein may be practiced, according to an embodiment. System 300 is implemented by a computing device comprising any combination of hardware and software configured to implement the various logical components described herein, including components 321-360. For example, system 300 may be a single networking computing device, such as a router or switch, in which some or all of the processing components described herein are implemented in application-specific integrated circuits (ASICs), field programmable gate arrays (FPGAs), or other integrated circuit(s). As another example, system 300 may include one or more memories storing instructions for implementing various components described herein, one or more hardware processors configured to execute the instructions stored in the one or more memories, and various data repositories in the one or more memories for storing certain data structures utilized and manipulated by the various components.

2.1. Data Units

System 300 is configured to receive, buffer, and process network traffic communicated in the form of packets 304. Each packet 304 is received as a set of subunits referred to herein as cells 305, and depicted in FIG. 3 as cells 305a-n. There may be any number of cells 305 in a packet 304. The first cell 305 in the packet 304 is generally referred to as the "start-of-packet," and the last cell 305 in the packet is referred to as the "end-of-packet." The first one or more cells 305 generally carry packet header information for the packet 304, such as fields for the source address, destination address, and other packet metadata. Any remaining space available within the first one or more cells 305 may be filled with the beginning of the "payload" of the packet 304—i.e. the principal data which the packet 304 is intended to communicate. The remaining cells generally carry the remainder of the payload of the packet 304.

Each cell 305 may be received at system 300 at separate times, and may in some embodiments even be received out of order. Cells 305 may be received for multiple packets concurrently. The cells 305 of a given packet 304 may be associated together using any of a variety of mechanisms, such as by a packet identifier or sequence number within the cell 305, a context in which they are received, and so forth.

Cells 305 may be received at system 300 via, for example, one or more network communication interfaces coupled to a network, over which they were sent from another device.

Although the term "cells" is used for illustrative purposes, the described techniques are equally applicable to frames or other constituent data units of a packet. More generally, the techniques may be advantageous in the buffering and processing of any transmitted data unit that constitutes a portion of a higher-level data unit, whether that higher-level data unit is a packet or another type of data unit.

2.2. Traffic Manager and Packet Processing

Once received at system 300, the cells 305 are eventually forwarded to a traffic management component 321 of system 300, referred to herein as a traffic manager 321. The cells 305 may be received over a period of time, spanning from a period t1 to tn, as depicted in FIG. 3. Prior to receipt at the traffic manager 321, the cells 305 may optionally be routed through and/or processed by a number of other components of system 300, such as ingress processors, arbitration components, egress processors, other traffic managers, and so forth.

Traffic manager 321 is any component configured to direct the flow of cells 305 to one or more packet processors 320. There may be any number of traffic managers 321 within system 300, each coupled to its own instances of the components depicted in FIG. 3.

A packet processor 320 may be configured to perform any of a variety tasks with respect to a cell 305, such as, without limitation, selecting a path for the cell 305, forwarding the cell 305 out an egress communication interface of system 300 to another device, forwarding the cell 305 to another packet processor 320 or traffic manager 321 of the system 300, manipulating the cell 305, replicating the cell 305, collecting statistics related to the cell 305, performing debugging operations based on the cell 305, and so forth. Traffic manager 321 is configured to utilize packet metadata 360 and/or contextual data to determine exactly which packet processor 320 should handle which cell 305.

2.3. Buffers

The packet processor(s) 320 may be incapable of concurrently processing all of the cells 305 that may arrive at traffic manager 321 at a given moment of time. Hence, traffic manager 321 may temporarily store cells 305 in a set of buffers 330. Traffic manager 321 further comprises buffer management logic 332 configured to determine where to buffer the cells 305 of packet 304.

The set of buffers 330 includes a number of distinct banks of memory. As used herein, the term "bank" should be understood to more generally refer to a "logical" memory bank rather than a physical memory bank, in that each bank may comprise a logical grouping of one or more distinct units of memory. Thus, for instance, a logical bank may be a collection of multiple physical banks that have been coupled together. On the other hand, in some embodiments, some or all of the logical banks may comprise only a single physical bank, and thus the term bank may in these cases refer to a single physical bank.

In an embodiment, each bank may be accessed for reading or writing only a limited number of times in a given period of time (e.g. a clock-cycle). For instance, each bank may be implemented using a single-ported Static Random Access Memory (SRAM), which supports relatively high-frequency clock cycles at the expense of limiting access to only a single read or write operation per clock cycle. In other embodiments, double-ported or other multi-ported memories may be utilized.

However, whatever memory limitations may exist, the traffic manager 321 is configured to schedule buffer read and write operations so as to ensure that no conflict occurs. This may entail, for instance, selecting the bank to store a given cell 305 in such a manner as to avoid storing the cell 305 in a bank that cannot be accessed in the current clock cycle (or other time period).

Each bank is divided into addressable locations referred to as entries 312. In an embodiment, the contents of each cell 305 are stored in a separate entry 312, which is assigned by the traffic manager 321. The traffic manager 321 keeps track of which entries are used to store cells 305 so as to ensure that one cell 305 does not overwrite another cell 305 that still needs to be processed. One mechanism for doing so is a "free" list, described in subsequent sections.

According to an embodiment, the traffic manager 321 may further write linking data 313 that is associated with each entry 312. This linking data 313 is generally stored in a separate memory (e.g. an "intra-packet link" memory), though in an embodiment it may instead be stored directly inside the entry 312 with which it is associated. This linking data 313 may likewise be subject to limited memory accesses in a given time period.

For a given cell 305 found in a given entry 312, the associated linking data 313 may indicate the address of another entry 312 that stores the next cell 305, of the given packet 304, that is found in the current bank, if any. Among other purposes, this data may assist in quickly transmitting or otherwise processing the packet 304 at a subsequent time. For example, as one cell 305 is retrieved from a given bank, the address of the corresponding packet's next cell 305 within that bank may be read so that the next cell 350 may be scheduled for retrieval.

This linking data 313 may further include some indication of the corresponding cell's 305 position within its containing packet 304, so as to be able to determine the order in which cells 305 are to be transmitted, processed, or otherwise arranged as they are retrieved from the buffer set 330.

Optionally, in an embodiment, other linking data 313 may indicate locations of preceding cells 305 or other important cells 305 within the given packet 304. Yet other linking data 313 may indicate linkages between cells 305 within the packet 304 as a whole, instead of with respect to specific banks.

2.4. Queues

To determine the order in which traffic manager 321 releases cells 305, traffic manager 321 includes queue management logic 336 that arranges cells 305, or the buffer entries that contain cells 305, into queues 324. Each queue 324 comprises an ordered set of nodes, with each node referencing a cell 305 (or buffer entry) by an appropriate identifier or address. When a cell 305 is buffered, the cell 305 is also added as the tail node 325 of the queue 324, and then gradually moved to the head of the queue 324 as other nodes arrive and depart from the queue 324 over time.

Any sort of queuing logic may be utilized to determine the next node (and, consequently cell 305) that should be processed, though in many embodiments the queue is a first-in-first-out (FIFO) queue. In FIFO-based implementations, the head node, which is typically the node that has been in the queue 324 the longest, is the next node to be processed. Thus, when a given cell 305 arrives at the head of the queue 324, the queuing logic will, at the next appointed time for releasing a cell 305 from the queue 324, release the given cell 305 to a packet processor 320.

There may be many queues 324, and each packet processor 320 may be associated with one or more distinct queues 324. In an embodiment, queue assignments are made on a packet-by-packet basis, such that all cells 305 from a given packet 304 are assigned to the same queue 324. In an embodiment, queue assignments are made based on packet metadata 360. This metadata 360 may include, for example, packet header data such as source and destination addresses, source and destination ports, packet types, protocol identifiers, packet sequence numbers, quality-of-service classes, and so forth. Many queue assignment techniques are known, and this application is not specific to any particular queue assignment technique.

In an embodiment, the linking of cells 305 to their corresponding packets 304 is maintained through an intra-packet link memory, as described elsewhere herein. Meanwhile, packets are linked within a queue 324 using an inter-packet link memory, as also described elsewhere herein.

In an embodiment, queues 324 are bound to ports. Access to egress packet processing bandwidth is arbitrated via a port scheduler (not depicted). When it comes time for another cell 305 to depart from the traffic manager 321, a port is selected by the port scheduler. A queue 324 bound to the port is selected by a queue scheduler (if no packets are active for the port). If a packet 304 is already actively being transmitted for the port, then the next cell 305 in the packet 304 is sent to the corresponding egress packet processor 320. If no packet 304 is active for the port, the first cell 305 of the packet 304 for the selected queue 324 is sent to the corresponding egress packet processor 320 for the queue 324. In yet other embodiments, ay other suitable technique for dequeue packets 304 may be utilized.

2.5. Packet Metadata

System 300 stores various packet metadata 360 for each packet 304. This packet metadata 360 may be stored in any suitable structure within one or more memories. For example, in an embodiment, some or all of the packet metadata 360 is initially stored in a "receive context" structure within a suitably fast memory until the entire packet 304 has been received (e.g. until the "end-of-packet" cell 305n has been buffered). For instance, the receive context may be stored in "flops", which does not have access restrictions. Once the entire packet 304 has been received, some or all of the packet metadata 360 may be shifted to another memory, typically slower and/or more restrictive than that used to store the receive context structure, such as an "inter-packet" memory comprising one or more memory banks of entries for storing packet linking metadata. Generally, the receive context is used to collect all the information needed to dequeue a packet prior to storage in the inter-packet memory.

In yet other embodiments, packet metadata 360 may be written directly to the inter-packet memory without a receive context.

In some embodiments, different portions of packet metadata 360 may be generated at different times. For instance, packet metadata such as a packet sequence number 361, a source port identifier 362, and a priority set identifier 363 may be generated as soon as the packet header has been read from one or more cells 305 at the start of the packet 304. This metadata 360 may be generated, for example, by the buffer management logic 332, queue management logic 336, or by another component of system 300 deployed in front of the traffic manager 321. Subsequently, as other information about the packet 304 is determined, the information may be added to the packet metadata 360, using the sequence number 361 or another identifier for lookup. Such information may include, for instance, an identifier 364 for a queue 324 to which the packet 304 is assigned.

Packet metadata 360 may further include addresses of certain cells 305 within the buffer set 330. For instance, in an embodiment, the first time buffer management logic 332 assigns a cell 305 for the packet 304 to each bank, the buffer management logic 332 may write the address of that cell and its position within packet 304 to the packet metadata 360. The addresses of the packet's first cells 305 within each bank, depicted in FIG. 3 as the per-bank head addresses 366a-n (or heads 366 for short), may subsequently be utilized to determine where to start retrieving cells 305 for the packet 304 when transmitting or otherwise processing the packet 304. For instance, for each bank in which at least one cell 305 for the packet 304 is stored, the head 366 for that bank may be scheduled for reading. To prioritize the read operations, position information 367 may be stored for each head 366, indicating the position of the corresponding cell in the packet 304. Paired with linking data 313, knowledge of head addresses 366 and positions 367 enables transmission or processing of the buffered cells 305 for a packet 304 in the correct order.

In an embodiment, the buffer management logic 332 may further write per-bank tail addresses 368a-n (or tails 368) and tail positions 369a-n (or tail positions 369) to packet metadata 360. The tail address 368 for a bank is the address of the last cell 305 of the packet 304 that has been stored within that bank. The tail position 369, meanwhile, is the position of that last cell 305 within the packet 304 as a whole. The tail information may be the same as the head information if a bank includes only zero or one cell 305 for the packet. The tail information may assist, for example, in building linking data 313, and thus buffer management logic 332 updates the tail information over time as it adds new cells 305 to buffer set 330. In some embodiments, once the entire packet 304 has been received, the tail information may be safely discarded.

Packet metadata 360 may of course include a variety of other undepicted information, depending on the embodiment, such as a count of cells 305 received so far, an overall head and/or tail address for the packet 304, other packet header information, and so forth.

2.6. Buffer Accounting

In some embodiments, system 300 further comprises a buffer accounting mechanism 340. In an embodiment, such an accounting mechanism 340 is included in or coupled to traffic manager 340. Buffer accounting mechanism 340 is configured to, among other tasks, monitor the use of buffers in buffer set 330 and generate buffer count information based thereon. The buffer count information may be stored in any suitable storage location, and/or communicated to buffer management logic 332, queue management logic 336, and/or other components periodically or upon request.

Accounting mechanism 340 maintains a count that indicates the number of buffer entries and/or amount of buffer space utilized by or available to each of a number of defined logical or physical "entities." The entities may include, without limitation, constructs such as ingress ports, egress ports, queues 324, priority sets, and/or traffic classes. The entities may, for example, correspond to specific values in the packet metadata 360, such as the value of a source port identifier 362 field or a queue identifier 364 field.

The buffer count information generated by buffer accounting mechanism 340 may serve any of a variety of purposes, such as, without limitation, indicating when a queue 324 or other entity's allotment of buffer space in buffer set 330 has been exhausted, or when the buffer set 330 is experiencing congestion related to that entity. Based on the buffer count information, buffer management logic 332, queue management logic 336, and/or others component of system 300 may be configured to perform various actions such as, without limitation, discarding ("dropping") certain sets of data units 305 (as opposed to buffering the data units 305 and sending them through queues 324), enabling rate control with respect to certain sets of data units 305, performing statistical or debugging operations, and so forth.

In some embodiments, to reduce the expense of the accounting mechanism 340, the accounting mechanism 340 may only count information at intermittent times (e.g. once every ten clock cycles, once every twenty clock cycles, etc.). The accounting mechanism 340 may, for instance, determine and report updated buffer count information for only a small subset of the entities each clock cycle, with the subset being chosen using a round robin approach and/or based on which entities exhibit a high level of recent activity. Alternatively, or additionally, the accounting mechanism 340 may resolve only an approximate utilization for an entity. A variety of suitable accounting mechanisms 340 exist in which resource utilization, such as per-entity buffer utilization, is tracked on a delayed, staggered, or otherwise approximate basis instead of in real-time.

2.7. Garbage Collection

System 300 further comprises a garbage collector 350, which may be included in, or separate from, the traffic manager 321. Garbage collector 350 implements logic for identifying buffer entries 312 that are no longer in use (i.e. that have been "freed"). Buffer entries 312 may have become freed for any of a number of reasons. For instance, the buffer entries 312 may have been used to store cells 305 that have been dropped, or that have already processed. For these buffer entries 312 that are no longer in use, garbage collector 350 may perform various actions such as adding the entry 312 back to a list of entries that are available for storing cells, updating buffer count information, ensuring that any necessary linking data 313 associated therewith is not lost prematurely, and so forth.

Garbage collector 350 typically executes at a lower-priority with respect to the resources of system 300, meaning that garbage collector 350 is typically configured to run "in the background" when memory I/O accesses and/or limited resources are not being consumed for other purposes. For example, a particular memory bank used to store the linking data 313 for a particular buffer entry 312 may be limited to only one I/O access per clock cycle. If that memory bank is currently being written to or read by the traffic manager 321, and if the garbage collector 350 needs to access the linking data 313 before freeing the entry 312, garbage collector 350 may not be able to "free" that entry 312 until the traffic manager 321 is done writing or reading the memory bank. Hence, system 300 may schedule garbage collection tasks around other memory accesses by the buffer management logic 332, queue management logic 336, packet processor(s) 320, and/or other components.

Although many garbage collection techniques are well-known, in an embodiment, an improved garbage collection technique allows for more efficient garbage collection in systems where the cells 305 of a packet 304 are distributed across multiple distinct memory banks, as in system 300.

In some embodiments, the techniques are particularly advantageous to garbage collection of cells 305 that are buffered, but then dropped prior to the arrival of the full packet (e.g. prior to the last cell 305n of the packet being buffered). This may occur, for instance, when queue management logic 336 determines that a packet 304 cannot be added to an assigned queue 324 (e.g. because of restrictions on queue-sizes or entity-based buffer utilization), that a packet 304 cannot be mapped to any queue 324, or that a packet 304 is missing certain cells 305. On the other hand, the technique may still yield advantages in other contexts, such as when dropping a packet 304 upon determining that a packet 304 does not meet a CRC check based on CRC information in the last cell 305n of the packet, or even when releasing the packet 304 from system 300 through normal means.

Packet Buffering

Figure 4:
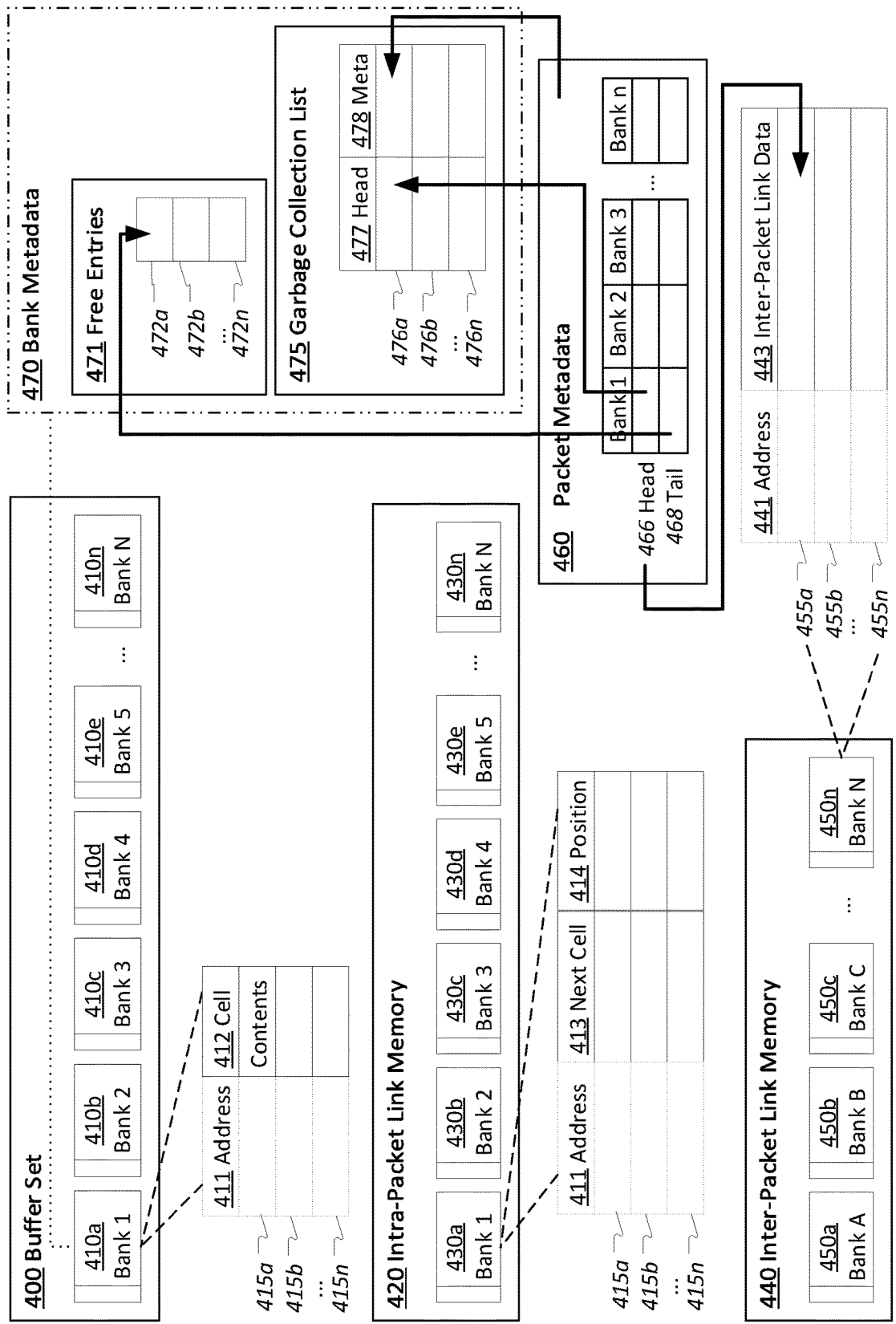
FIG. 4 illustrates various memory structures that may be utilized by a garbage collection component.

FIG. 4 illustrates various memory structures that may be utilized by a garbage collection component, such as garbage collector 350, according to an embodiment. Although the memory structures may be utilized in system 300, the structures may likewise be utilized in other systems in which the described techniques are practiced, that are not necessarily arranged in the same manner as system 300. Note that the structures may be utilized for a number of purposes FIG. 4 depicts a set of buffers 400, also referred to as a buffer set 400, comprising buffer memory banks 410a-n, collectively referred to as banks 410. Each bank 410 may be a distinct memory bank, set of memory banks, or other unit of memory. Banks 410 may be implemented using any suitable type of memory.

Each bank is divided into addressable locations referred to as entries 415a-n (collectively "entries 415"). Each entry 415 has a corresponding address 411 by which it may be located. Each entry 415 may be used to store the contents 412 of a data unit, such as of a cell 305 or other data unit portion. Entries 415 may or may not each store the same amount of data, depending on the embodiment. In an embodiment, entries 415 are the same as entries 312.

Intra-Packet Link Memory

FIG. 4 further depicts an intra-packet link memory 420 comprising a set of intra-packet link memory banks 430 storing data such as described with respect to link data 313. Each bank 430 corresponds to a different bank 410. To simplify description in certain contexts, each bank 430 is sometimes referred to herein as a separate link memory, or intra-packet link memory, with each bank 410 having its own link memory.

For each given entry 415 in a bank 410, the corresponding bank 430 includes next-packet-cell-in-bank information 413, also referred to as next-cell or next-entry information 413. The next-cell information 413 indicates the address of another entry 415 within the bank 410 that contains another cell within the same packet as the cell contained in the given entry 415, if any. In an embodiment, this other cell is the cell, stored within the bank 410, whose position more closely follows the given entry's cell within the packet than any other cell stored in the bank 410. While in some embodiments, this other cell may in fact be the next cell in the packet, in other embodiments various optimization rules may prevent storing cells whose positions are less than a certain distance from each other (e.g. consecutive cells, cells within three positions of each other, etc.) within the same bank 410.

Collectively, the next cell data 413 for each entry 415 whose constituent data belongs to the same packet, defines a chain of buffer entries 415 belonging to that packet. Moreover, because cells for the same packet may be found in multiple banks 410, some or all of the banks 410 may have their own chain of entries 415 for that packet. On account of the assignment mechanism and general usage as cells are released over time, a chain will typically be non-contiguous, in that the addresses of at least some entries in the chain are not consecutive.

The link memory 430 may further include cell-position-in-packet information 414 for each entry 415, also referred to as position information 414. Position information 414 indicates the position of each entry's cell within the cell's corresponding packet. Alternatively, or additionally, the link memory 430 may store other packet linking information if appropriate.

In an embodiment, the intra-packet link memory 420 is stored in separate memories than the buffer set 400. Each bank 430 may have its own access limitations (e.g. number of I/O operations per clock cycle), separate from the bank 410 to which it corresponds. In another embodiment, banks 430 and banks 410 are in fact stored in the same memory. A single entry 415 may have cell contents 412, next-cell information 413, and position information 414.

Free List

For each bank 410, certain bank metadata 470 is also stored. Among other information, bank metadata 470 includes a free entry table 471. The free entry table 471 for a bank 410, which is also referred to as a free list 471, indicates each entry 415 in the bank 410 that is currently free, or available, to store a new data. For example, the freeble list 471 may include a number of slots 472, each of which may either be empty, or contain the address of an entry 415 that is currently free. Of course, entries 415 may be indicated as free using any other suitable technique.

An entry 415 may be indicated as free on account of not having previously stored any data, or on account of its current contents no longer being needed. The contents of an entry 415 may no longer be needed, for instance, if the corresponding data unit has been dropped, sent, or otherwise processed to completion. An entry 415 is said to be "freed" or available once the entry 415 is added to the free list 471 (i.e. once the free list 471 indicates that the entry 415 is free).

When an entry 415 is needed to store data in a bank 410, the free list 471 is consulted to identify an entry 415 that is indicated as free. Any entry 415 in the free list 471 may be selected, depending on the embodiment.

Garbage Collection Lists

Bank metadata 470 further includes one or more garbage collection lists, including the depicted garbage collection list 475. Garbage collection list 475 is a cache or other suitable memory in which is stored indicators of buffer entries that are ready to be released for garbage collection. Garbage collection list 475 comprises a number of slots 476, each corresponding to a chain of one or more entries 415 that need to be freed. Each chain may also be referred to as a garbage collection chain. A garbage collector, such as garbage collector 350, periodically examines each garbage collection list 475 and utilizes the information found therein to free the entries 415 in the indicated chains of entries 415.

Freeing the entries 415 in a chain requires certain steps that cannot be completed in a single clock cycle. Only the address 477 of the first entry 415 in the chain (a.k.a. the head address 477) is readily available at the time the chain is added to the garbage collection list 475. The addresses of other entries 415 in the chain can only be obtained through reading link data found in the link memory 430 for the bank 410. Specifically, the next cell data 413 of the first entry 415 must be read to locate the second entry 415 in the chain, whose next cell data 413 must then be read to locate the next entry 415 in the chain, and so on until the next cell data 413 of each entry 415 in the chain has been read in succession.

Some chains, depending on the order of storage and length, may require several clock cycles to release all the pending cells. Moreover, additional delay in reading the link data for certain chains may be added if the garbage collector is only permitted to access the link memory 430 when the link memory 430 is not scheduled for other operations. Steps must therefore be taken to ensure that the link data needed to reconstruct the chain of entries is not overwritten before it can be accessed. Accordingly, the garbage collector is configured to not free an entry 415 at least until the next cell data 413 for the entry 415 has been read.

More specifically, whenever the link memory 430 for a bank 410 is available for access by the garbage collector (e.g. not scheduled for conflicting I/O operations), the garbage collector reads the address 477 of the head entry 415 for the next chain within the queue 475. The garbage collector then reads the next cell data 413 for the indicated head entry 415 to identify the address of the next entry 415 in the chain. The garbage collector then frees the head entry 415 by adding its address to the free list 471, and sets the head address 477 for the chain to that of the next entry 415. If no next entry is indicated in the next cell data 413, then the current entry 415 is assumed to be the last entry 415 in the chain that needs to be freed. Hence, the chain is removed from the garbage collection list 475 (e.g. slot 476 is cleared or removed).

The garbage collector may further be configured to perform other tasks before or responsive to freeing an entry 415. For example, in an embodiment, the garbage collector may need to update one or more buffer counters to reflect the fact that the entry 415 is no longer being used. In an embodiment, therefore, each slot 416 in the garbage collection list 475 includes various packet metadata 478 indicating entities that are associated with the packet to which the contents of the corresponding chain belong. For example, metadata 478 might indicate a source port, ingress queue, priority class, egress queue, egress port, buffer partition, and/or any other entity. Counters associated with the indicated entities are decremented before or in response to freeing an entry 415.

The slots 476 in the queue 475 may be organized according to any suitable prioritization mechanism, such as FIFO, chain length (if known), and so forth.

Each bank 410 has its own garbage collection list 475, and the garbage collector may be configured to act upon some or all of these queues 475 concurrently. For example, the garbage collector may free entries for bank 410a at the exact same time it is freeing entries for bank 410b, assuming both of their link memories 430 are available for access.

Note that the entire process of freeing an entry 415 may in fact occur over several clock cycles. For instance, one clock cycle may be devoted to reading next cell data 413, another may be devoted to updating the head of a chain, and so forth. To avoid conflicts, the garbage collector may wait until the process of freeing the head entry 415 in a chain has been completed before the garbage collector can begin freeing the next entry 415 in the chain.

In an embodiment, to increase bandwidth, the garbage collector may begin freeing entries from one or more additional chains in the garbage collection list 475 before it finishes freeing the head entry of the first chain. For instance, in the clock cycle immediately after reading the next cell data 413 for the chain corresponding to slot 476a, while the garbage collector is performing additional tasks to free the head entry of that chain, the garbage collector may begin reading the next cell data 413 for the chain corresponding to slot 476b (assuming that the link memory 430 is still available for access). The garbage collector may actually be in the process of freeing the head entries from two, three, or even more chains currently, depending on the number of clock cycles needed to free an entry.

In an embodiment, to further optimize the garbage collection process, a shallow cache is utilized, into which a certain number of the highest priority slots 476 are written. The garbage collector continuously cycles through the slots 476 in the shallow cache, freeing and updating the head entry of each corresponding chain. Once a corresponding chain is completed, the contents of the next highest priority slot 476 slot take its place.

Packet Metadata

According to an embodiment, when a packet is dropped, and/or otherwise disposed of, various packet metadata 460 associated with the packet may be utilized to quickly populate the garbage collection list 475 in order to expedite the freeing of any entries 415 that store cells belonging to the packet. Packet metadata 460 may be, for instance, the same as, a subset of, or a superset of the packet metadata 360. Depending on the embodiment and/or when a packet is dropped, packet metadata 460 may be stored and read from a temporary receive context, an entry 455 of an inter-packet link memory 440, or any other suitable location.

This packet metadata 460 may include, for instance, per-bank head addresses 466. Per-bank head addresses 466 indicate, for each bank 410, the address of the entry 415 that stores the packet's first cell in that bank 410 (if any). For instance, per-bank head addresses 466 may be the same as bank head addresses 366.

When a packet is disposed of, its per-bank head address 466 of each bank 410 may be added to the garbage collection list 475 of that bank 410. In other words, each per-bank head address 468 becomes the head address 477 of a new chain that is added to the corresponding bank's garbage collection list 475. The packet's chain of cells in that bank 410 becomes, in essence, a garbage collection chain that can then be gradually freed by the garbage collector over time.

In further support of the garbage collector, various other packet metadata 468 may be copied or linked to each of the newly added head address 477. For instance, entity identifiers associated with the packet, such as source port identifier 362, priority set identifier 363, or a queue identifier 364, may copied to the packet metadata 468 associated with each garbage collection chain.

Packet metadata 460 may further include a per-bank tail address 468 for the packet. Per-bank tail addresses 468 indicate, for each bank 410, the address of the entry 415 that stores the packet's last cell in that bank 410 (if any). For instance, per-bank tail addresses 468 may be the same as bank tail addresses 368.

In an embodiment, when the packet is disposed of, the entries 415 corresponding to the per-bank tail addresses 468 may be freed immediately. That is, the per-bank tail addresses 468 may be added directly to the free lists 471 of their corresponding bank 410. If the tail address 468 and head address 466 are ever the same for a bank 410 (i.e. the chain for that bank 410 has only a single entry 415), then the head address 466 need not be added to the garbage collection list 475 for the bank 410.

In some such embodiments, the tail address 468 may be reassigned to a new packet before the garbage collector reaches the end of the garbage collection chain. To avoid freeing the tail address 468 again and inadvertently disposing of the new packet, the tail address 468 may be added to the packet metadata 478, which the garbage collector reads so that the garbage collector knows that it has reached the end of the chain, and will stop before freeing the tail address 468 again.

Inter-Packet Link Memory

In an embodiment, there may optionally be an inter-packet link memory 440 in which each packet comprises a single entry 455 at a corresponding address 441. Each entry may include inter-packet link data 443, including some or all of packet metadata 460. For instance, in an embodiment, while a packet is still being received and buffered, packet metadata 460 may be stored in a fast, but expensive memory that implements a receive context. Once the final cell of the packet has been received and buffered, the packet may then be "linked," in that an entry 455 is made for the packet in the inter-packet link memory 440. Some or all of the packet metadata 460 may be copied from the receive context to this new entry 455. For instance, in an embodiment, the head data 466 is copied to the entry 455, while the tail data 468 is discarded.

Inter-packet link memory 440 may comprise any number of intra-packet link memory banks 450, including a different number of banks than in buffer set 400 and intra-packet link memory 420. The entry 455 in which the inter-packet link data 443 is stored for a packet may be selected from any bank 450, regardless of the banks 410 in which its cells are stored. Banks 450 may be in a same or different physical memory than banks 410 and 430.

Among other purposes, the inter-packet link data 443 may be utilized to reconstruct a packet when it is time to forward the packet to a next component or device. For instance, when it is time to send the packet out an egress port, its inter-packet link data 443 may be read from its corresponding entry 455. The head data 466 for the packet may be utilized to schedule initial read operations from the various banks 410 in which the cells for the packet are found so as to locate the first cells of the packet. The intra-packet link memory 420 may then be read to locate subsequent cells for the packet.

Optionally, in an embodiment, certain entries in the inter-packet link memory 440 may include or be associated with one or more additional entries in an undepicted secondary memory, referred to as a snapshot memory. The inter-packet link data 443 may include head addresses 466 for one or more banks 410 in which the first cells for the packet are stored. The remaining head addresses 466 may be stored in one or more entries in the snapshot memory, to which the corresponding entry 455 may include a pointer. In this manner, the size of each entry 455 in the intra-packet link memory may be reduced. Meanwhile, in some embodiments, the snapshot memory may be implemented with fewer entries than the intra-packet link memory, since not all packets in the intra-packet link memory would need an entry in the snapshot memory. Moreover, the size of each entry 455 may be selected such that for many smaller packets, the snapshot memory would not need to be read. The net effect of such an arrangement may be, for instance, an overall decrease in memory needed for the intra-packet link data and/or more optimized access to the intra-packet link data.

In yet another embodiment, instead of using a separate receive context, an entry 455 may be created for the packet metadata 460 as soon as the first cell is received, and the packet metadata 460 may be stored therein. In yet another embodiment, other suitable types of structures may be utilized for the described functions instead of an inter-packet link memory 440.

Garbage Collection Queue

In an embodiment, there may be times when not all buffer entries awaiting garbage collection can fit in the garbage collection list. Accordingly, a special garbage collection queue may be created. The garbage collection queue may be of similar structure and mechanics as a queue 324. Dropped packets may be linked to the garbage collection queue just as any other packet would be linked to queue 324. However, instead of being consumed by a normal packet processor 320, dequeued buffer entries may be placed in the garbage collection list. Depending on the embodiment, the garbage collection queue may be utilized whenever the size of the garbage collection list is greater than some threshold, and/or any time a packet is dropped in a certain context.

2.8. Miscellaneous

System 300 illustrates only one of many possible arrangements of devices configured to provide the functionality described herein. Other arrangements may include fewer, additional, or different components, and the division of work between the components may vary depending on the arrangement.

For instance, although only one traffic manager 321 is depicted, system 300 may have any number of traffic managers 321, which may be configured to process various sets of data units 305 in serial or in parallel. Each traffic manager 321 may be coupled to its own buffer set 330, packet processor(s) 320, and other associated components. A separate garbage collector 350 may exist for each buffer set 330, or the same garbage collection logic may be utilized for one or more buffer sets 330.

Although traffic manager 321 is given as an example of a component in which the techniques described herein may be practiced, these techniques may equally be practiced in any component that handles the flow of data units to a packet processor 320, whether that packet processor is considered to perform ingress, egress, or other functions. For instance, the techniques may also be practiced in an arbitration component that handles cells 305 destined for ingress processing. Hence, garbage collection steps described herein as being performed by or within a traffic manager should be understood as also be capable of performance within an arbitration component or other component configured to direct traffic to a packet processor.

Similarly, FIG. 4 illustrates only one of the many possible arrangements of memory structures configured for use in providing the functionality described herein. Other arrangements may similarly be utilized.

Although, for simplification, a one-to-one correspondence between cells and entries is depicted, in other embodiments, there need not be a one-to-one correspondence. For instance, a cell or frame might be stored across multiple linked buffer entries, or multiple cells or frames may be stored in a single entry. The techniques are more generally applicable to any packet or data unit having constituent data stored in disparate entries across multiple banks. These entries may be linked together in a chain in the same manner as described herein, regardless of whether they store single cells, or other data portions.

3.0. Functional Overview

The various elements of the process flows described below may be performed in a variety of systems, including in system 300 described above. In an embodiment, each of the processes described in connection with the functional blocks described below may be implemented using one or more integrated circuits, logic components, computer programs, other software elements, and/or digital logic in any of a general-purpose computer or a special-purpose computer, while performing data retrieval, transformation, and storage operations that involve interacting with and transforming the physical state of memory of the computer.

3.1. Buffering Packet Data

Figure 6:
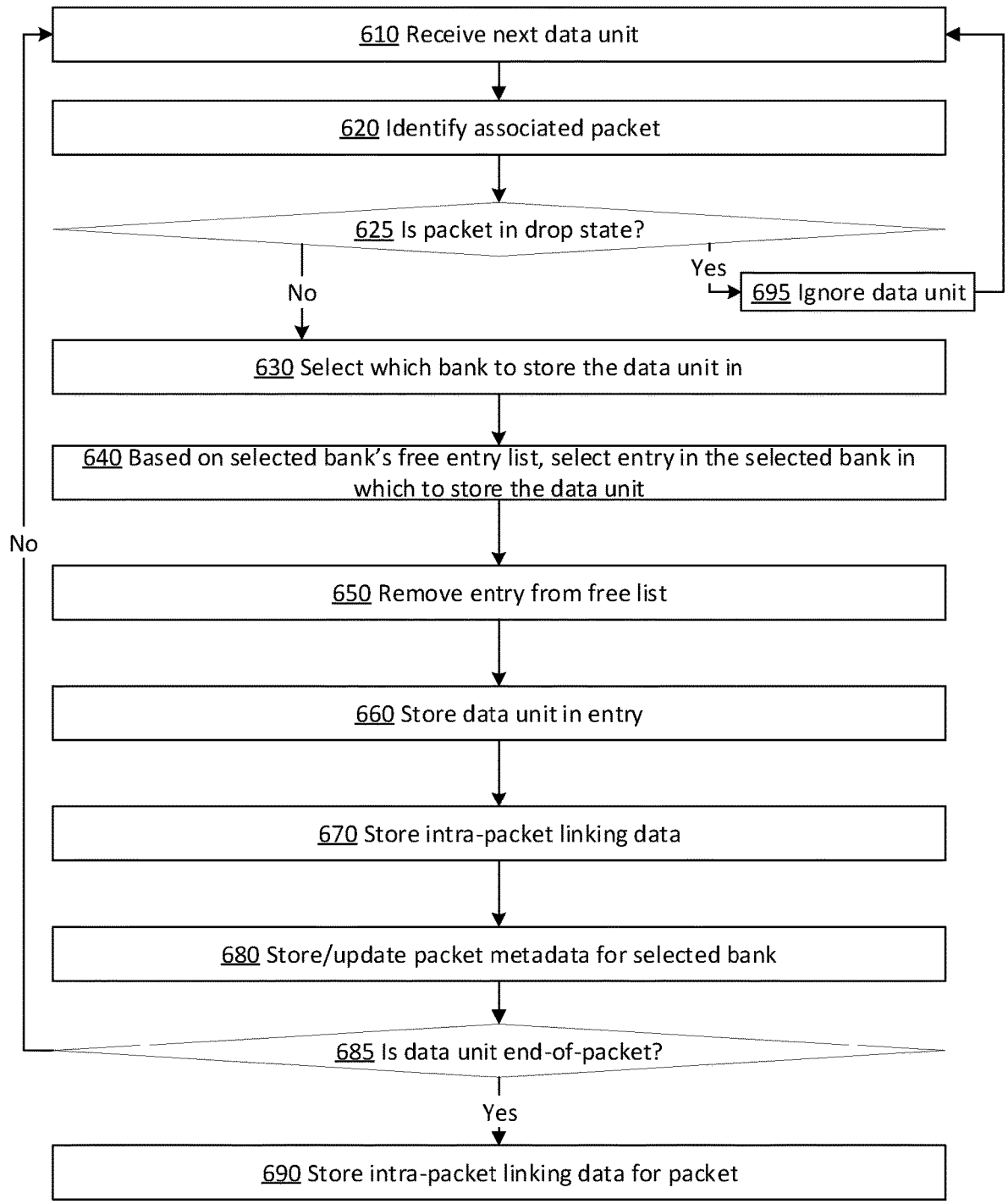
FIG. 6 illustrates an example flow for buffering packet data at a component of a network device.

FIG. 6 illustrates an example flow 600 for buffering packet data at a component of a network device, according to an embodiment. Flow 600 may be implemented by any component configured to buffer data, but in an embodiment is particularly adapted to buffering by a traffic manager configured to manage the flow of packets through egress packet processors. For instance, flow 600 may be performed by traffic manager 321 while manipulating memory structures such as depicted in FIG. 3 and/or FIG. 4.

Block 610 comprises receiving a next data unit, such as a cell or frame, at a component of a network device, such as a traffic manager. In an embodiment, the received data unit may be any portion of a packet or other higher-level data unit. The data unit may be received directly via a communication interface, or the received data unit may have been pre-processed by one or more system components disposed between the receiving component and the communication interface.

Block 620 comprises identifying a packet associated with the data unit. For instance, block 620 may comprise identifying a packet sequence number or other identifier associated with the data unit. Although the term "packet" is used here for ease-of-explanation, block 620 and other described steps may equally be performed with respect to other higher-level data units to which the data unit may belong.

Block 625 comprises determining whether the packet is in a drop state from a previous drop event. The packet may have been dropped for a variety of reasons, such as explained elsewhere herein. If the packet is in a drop state, the flow 600 proceeds to block 695, which involves ignoring the data unit and returning to block 610 to receive another data unit. Otherwise, flow 600 proceed to block 630. Note that the dropping of the packet in the middle of flow 600 necessitates performance of block 700, as described subsequently.

Block 630 comprises selecting which bank to store the data unit in. There may be a plurality of different banks in which the data unit may be stored, such as banks 410a-n. A variety of buffer assignment mechanisms may be utilized to select which bank to store the data unit, such as, without limitation, a round-robin approach, or a bank prioritization mechanism based in part on one or more buffer accounting metrics. The techniques described herein are not specific to any particular buffer assignment mechanism, though in at least one embodiment additional advantages may be realized in embodiments where the buffer assignment mechanism is configured not to store consecutive data units from the same packet in the same bank.

Block 640 comprises, using the selected bank's free entry list, selecting a free buffer entry in the bank in which to store the data unit. As described elsewhere, each of the banks may have a table, list, or other structure, commonly referred to as the "free list," indicating which buffer entries in the bank are available to store new data units (as opposed to being occupied by data units that still need to be processed). Any of the buffer entries found in this list are considered "free" or "available," and may be selected to store a new data unit.

The mechanism used to select a specific free buffer entry from the free list to store a specific data unit may vary depending on the embodiment. For instance, the buffer entry with the lowest or highest address may be selected, or the buffer entry that has been freed the longest may be selected, or a random entry may be selected.

Block 650 comprises removing the selected buffer entry from the buffer's free list, so that the entry is no longer considered available to store subsequently received data units.

Block 660 comprises storing the data unit in the selected buffer entry.

Block 670 comprises storing intra-packet linking data, if needed. Specifically, if the bank has previously been used to store any data unit for the packet, then linking data associated with the packet's previous most recently stored data unit in the bank is updated to contain the address of the entry in which the new data unit was stored per block 660. Thus, the selected buffer entry is added to a chain of entries, within the bank, that store data for the packet.

Examples of such linking data are found elsewhere in this disclosure, and may include, for instance, packet linking data 313 or next-cell data 413. In an embodiment, a receive context or other packet metadata stores a bank tail address for the packet, such as a tail address 368 or 468, by which the packet's most recently stored data unit in the bank may be easily located. If the bank tail address is empty, the packet is assumed not to have any other data units within the bank, and no intra-packet linking data need be stored.

Block 680 comprises storing and/or updating packet metadata for the selected bank. If no other data unit for the packet has previously been stored in the bank, block 680 may comprise writing the address of the selected buffer entry to a head address field for the bank, such as to a corresponding head address 366 or 466 field. In an embodiment, block 680 may further comprise updating a tail address field for the bank to store the address of the buffer entry in which the data unit was stored.

Block 685 comprises determining whether the data unit is the last data unit in the packet (i.e. the EOP). If not, then from block 685, flow 600 may return to block 610 for buffering of additional data units. Otherwise, flow proceeds to block 690, which comprises "linking" the packet. The linking of the packet may entail, for instance, storing certain inter-packet linking data in an inter-packet memory or snapshot memory such as described in other sections.

Flow 600 illustrates only one of many possible flows for buffering a data unit. Other flows may include fewer, additional, or different elements, in varying arrangements. For example, blocks 680 and/or 670 may actually occur before other blocks of flow 600, such as block 660. As another example, in an embodiment, a data unit may be larger than a single entry, and multiple entries may be selected and linked together for storing the data unit. In yet other embodiments, blocks 690 and 685 may be optional.

In an embodiment, flow 600 may be performed for multiple data units at least partially concurrently.

3.2. Responding to Drop Event

Figure 7:
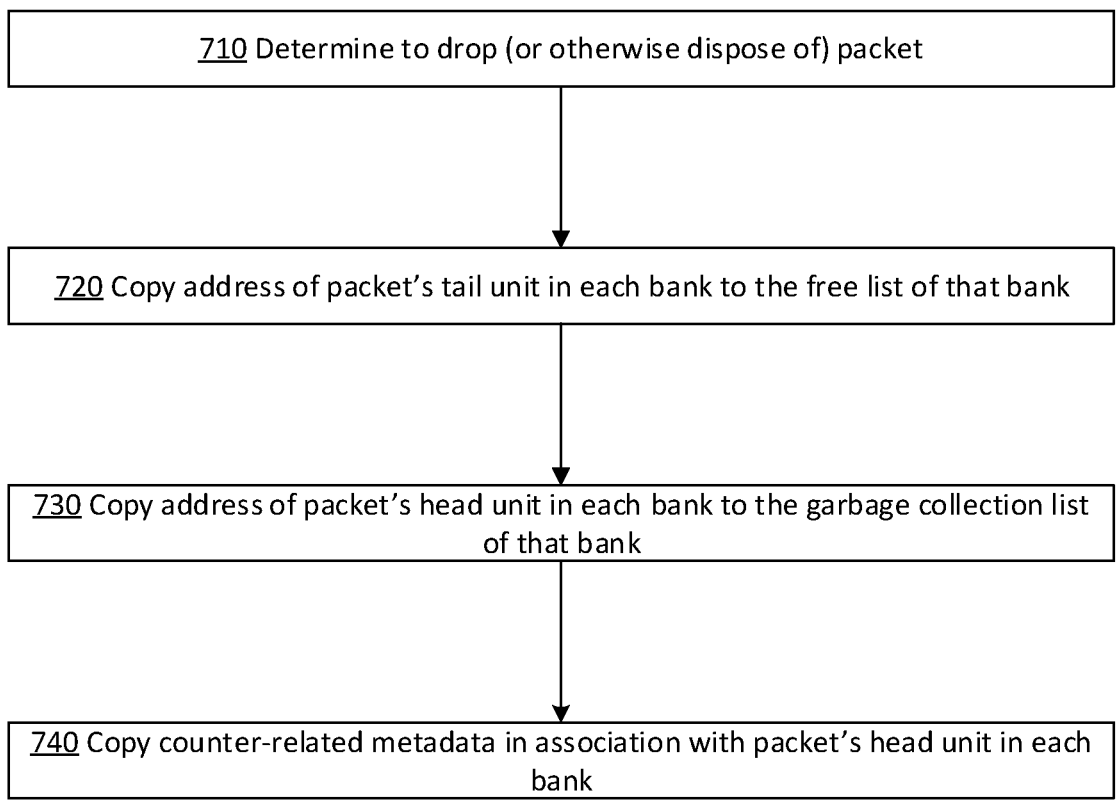
FIG. 7 illustrates an example flow for responding to a dropped packet.

FIG. 7 illustrates an example flow 700 for responding to a dropped packet, according to an embodiment. Flow 700 is implemented with respect to memory structures such as generated or manipulated in the process of performing flow 600. Flow 700 may be implemented by one or more components of a network device, such as a traffic manager, packet processor, and/or other suitable component.

Block 710 comprises determining to drop, or otherwise dispose of, a packet that is already at least partially buffered.

Such a determination may occur in response to a variety of different events. For instance, after buffering one or more data units within a packet, a traffic manager may determine that the packet is assigned to or associated with a queue or other entity that currently lacks a sufficient allocation of buffer space to store the packet. Similarly, the traffic manager may determine that an associated entity is in a congested state or other state that restricts its ability to accept the packet. As yet another example, the traffic manager may determine that the packet is missing one or more cells. Based on these or similar determinations, the traffic manager may decide to drop the packet. Such a determination may occur while the packet is still being received, and/or after a packet has been received, depending on the embodiment.

Block 720 comprises, in response to block 710, and for each bank in which at least one data unit belonging to the packet is buffered, copying the bank tail address for the packet to the bank's free list. The bank's tail address is the address of the last entry within the bank in which data for the packet was buffered. Thus, in other words, in each bank, the entry storing the data unit of the packet most recently added to that bank is freed immediately, since this may be done without losing any essential link data necessary to locate other entries that need to be freed.

In an embodiment, the bank tail addresses may be read from a packet receive context or other metadata, where it may have been stored, for instance, as a result of performance of block 680 in flow 600. Tail addresses 368 and 468 are examples of bank tail addresses.

Block 730 comprises, further in response to block 710, and for each bank in which at least one data unit belonging to the packet is buffered, copying the head address for the packet to a garbage collection list for the bank. The bank's head address is the address of the first entry within the bank in which data for the packet was buffered. Thus, in other words, the packet's chain of data units within each bank is added to that bank's garbage collection list, beginning with the first data unit in that chain.

In an embodiment, the bank head addresses may be read from a packet receive context or other metadata, where it may have been stored, for instance, as a result of performance of block 680 in flow 600. Head addresses 366 and 466 are examples of bank head addresses.

In an embodiment, block 730 may be skipped for any bank if no entries for the bank require traversal. This may be the case, for instance, if the packet's head address is the same as the packet's tail address, or if there are no entries between the packet's head address and tail address. In such cases, the packet head address would be copied to the free list in block 720.

Block 740 comprises copying, or otherwise linking, counter-related metadata for the packet with the packet's head address in each bank's garbage collection list. This metadata may include, for instance, identities of one or more entities with which the packet is associated, such as source port identifier 362, priority set identifier 363, or queue identifier 364. Again, such metadata may be found in the packet's receive context or other appropriate packet metadata that has been stored or tracked for the packet. It may be useful to have this metadata readily available to the garbage collection list in order to decrement any counters related to these entities as the packet's data units are freed.

Flow 700 illustrates only one of many possible flows for responding to a drop event. Other flows may include fewer, additional, or different elements, in varying arrangements. For example, in some embodiments, block 720 is optional. Freeing the tail address immediately may, for instance, require more complex logic that may be undesirable in certain implementations. Or, freeing the tail address may require additional tasks that cannot be performed immediately. In some embodiments, the tail address may be added to the same garbage collection list as the head address. In another embodiment, the tail address is instead added to a different garbage collection list, processed separately from the head address. In yet other embodiments, no special action is taken with respect to the tail address, and the tail address will be freed through the same mechanism as every other packet in the packet chain.

In some cases, block 730 and 740 may not be needed. For example, the current cells in the packet may be written to memories in a manner that can be released without accessing any of the link memories. They may thus be released immediately without performance of block 730 and 740.

In an embodiment, to further improve performance of the garbage collection, the packet metadata may additionally store the first N addresses of the packet for each bank, in addition to the tail address, so that N+1 entries within each bank may be freed immediately. If there are more than N+1 entries in a given bank, blocks 730 and 740 would still need to be performed. However, block 730 would begin with the last non-tail address of each bank's chain (the Nth address) instead of the head address. The remaining addresses stored in the packet metadata would each be copied to the free list in block 720.

In an embodiment, block 730 more generally comprises copying a starting address for each chain of entries that needs to be freed for the packet. This starting address may be a head address in some embodiments, while in other embodiments the starting address may be the last known address at the head of the chain—i.e. the last address that is stored in the packet metadata.

3.3. Background Garbage Collection of Packet Data

Figure 8:
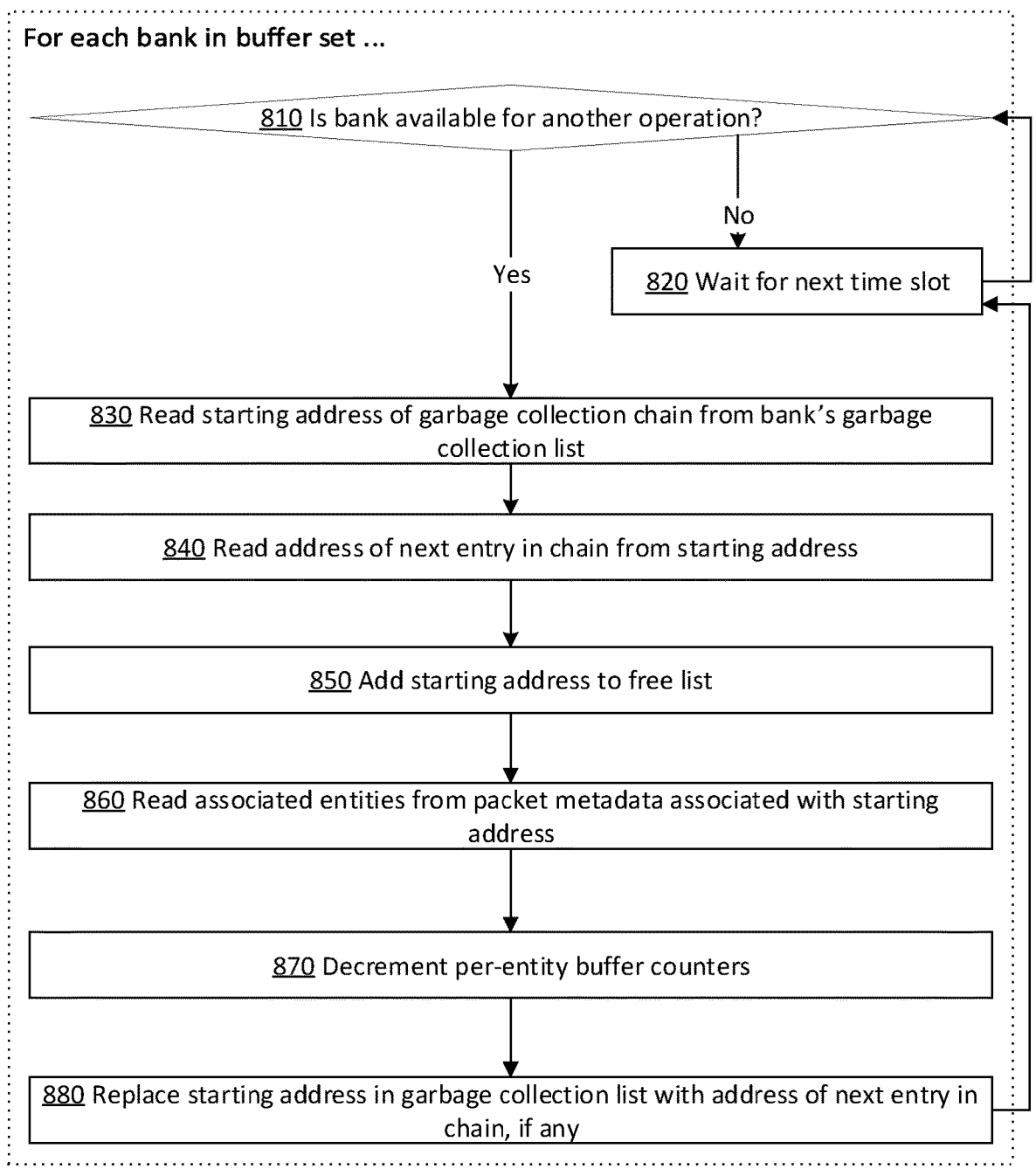
FIG. 8 illustrates an example flow for performing background garbage collection of packet data.

FIG. 8 illustrates an example flow 800 for performing background garbage collection of packet data, according to an embodiment. Flow 800 may be performed by any suitable garbage collection component within a network device, such as garbage collector 350. Flow 800 is implemented with respect to memory structures such as generated or manipulated in the process of performing flows 600 and 700. Flows 600, 700, and 800 may be performed concurrently in the same network device with respect to different packets that are being or have been received by that network device.

Flow 800 is performed separately for each bank in a set of banks used to buffer data units, such as buffer set 330 or 400. Flow 800 is repeated periodically or at other intervals for each of these banks.

Block 810 comprises determining whether the bank link memory is available for another operation. The link memory may only be accessible a certain number of times in a given time slot. Typically, tasks other than garbage collection will have priority in accessing the bank link memory. Such tasks may include writing new link data to the link memory, as in block 670 of flow 600, reading link data for data units from the bank while processing a packet, and so forth.

If all of the available I/O access operations for the bank link memory are being used in a given time slot, then the bank link memory is said to be locked, and no garbage collection tasks may proceed. Hence, flow 800 proceeds to block 820, which comprises waiting for the next available time slot to begin a garbage collection task. Each time slot may be, for instance, a set of one or more clock cycles.

Blocks 810 and 820 may be performed once each time slot by the garbage collector, or a scheduler component may perform blocks 810 and 820 in advance, and schedule times for the garbage collector to begin garbage collection tasks (i.e. proceed with block 830 for a given bank).

If the bank is not locked, then flow 800 proceeds to block 830. Block 830 comprises reading the starting address of a garbage collection chain from a garbage collection list for the bank. In an embodiment, the starting address is the first unfreed entry in a chain of entries within the bank that stores data for a dropped packet. The starting address may be, for example, a per-bank packet head address written in block 730. Or, the starting address may be an address written as a result of following the garbage collection chain in block 880 of a previous iteration of flow 800.

As illustrated in FIG. 4, there may be, at any time, multiple starting addresses in the garbage collection list, each corresponding to a different garbage collection chain. For the purposes of block 830, a starting address may be selected from the garbage collection list using any suitable prioritization scheme to identify and select a highest priority garbage collection chain. For instance, the queue may be a FIFO queue, and the next starting address may be the starting address that has been in the garbage collection list the longest, or the starting address of the garbage collection chain that has been in the queue the longest.

In an embodiment, multiple instances of flow 800 may be performed concurrently for the same bank, in a staggered manner. However, only one entry may be freed from a given garbage collection chain at a time. Hence, if the highest priority garbage collection chain in the queue is still being processed by a concurrently executing instance of flow 800, the starting address selected in block 830 may be another one of the highest priority garbage collection chains that is not already being processed.

Of course, if there are no garbage collection chains within the garbage collection list, flow 800 returns to block 820 to wait for another time slot.

Block 840 comprises reading the address of the next entry, if any, in the garbage collection chain from link data associated with the starting address. For instance, block 840 may comprise reading next cell data 413 for an entry 415 corresponding to the starting address.

Block 850 comprises adding the starting address to a free list for the bank, such as to free list 471.

Block 860 comprises reading one or more associated entities from packet metadata that has been associated with the starting address, the garbage collection chain, and/or a packet to which the data in the starting address corresponds. For instance, block 860 may comprise reading the data written or linked in block 740 of flow 700, or metadata 478 from FIG. 4.

Block 870 comprises decrementing one or more per-entity buffer counters for the entities identified in block 860. For instance, block 860 may indicate that the packet whose data is found at the starting address belongs to a particular queue or source port. Block 870 may thus comprise decrementing a count of buffers currently utilized for the particular queue, source port, ingress port, buffer partition, egress port, and/or other entities.

Block 880 comprises replacing the starting address in the garbage collection list with the address of next entry in chain, as read in block 840. If this is the last unfreed entry in the chain (e.g. the last or next to last cell for a packet in the bank, depending on the embodiment), then the garbage collection chain is removed entirely from the garbage collection list.

From block 880, flow may return to block 820 to wait for additional garbage collection tasks.

Flow 800 illustrates only one of many possible flows for performing background garbage collection of packet data. Other flows may include fewer, additional, or different elements, in varying arrangements. For instance, blocks 860 and 870 may be optional. Moreover, the order of certain blocks 840-880 may vary relative to each other.

In an embodiment, a garbage collection process may follow and free a chain of entries without the specific details of flows 700 and 800. For instance, instead of replacing the head address of a chain of entries in a garbage collection list, a separate cursor indicating the garbage collector's current position in the chain may be kept and updated. Or, instead of writing the head address to the garbage collection list, information by which the head address may be located is written to the garbage collection list. Other similar modifications may also be made to adjust how a chain of entries is gradually freed.

4.0. Example Garbage Collection of Dropped Packet

FIGS. 5A-5F illustrate the contents of example buffer-related memory structures as they are manipulated over time by garbage collection and related processes. The numbers and sizes of buffers and related data depicted in FIGS. 5A-5F are merely illustrative, and the techniques described herein may be used in other embodiments with any number of banks of any size. Moreover, the techniques may be applied to packets having any number of buffered data units.

FIGS. 5A-5F include banks 510*a-n* (collectively banks 510). Bank 510*a* includes entries 515*a-n*, bank 510*b* includes entries 516*a-n*, bank 510*c* includes entries 517*a-n*, and bank 510*n* includes entries 518*a-n*. Each of these entries, collectively referred to as entries 515-518, includes a content field 512, a next entry field 513, and a position field 514. In an embodiment, next entry field 513 and position field 514 may be stored in a different memory, referred to as a link memory, than the actual buffer content 512.

For each bank 510, there is a corresponding free list 571 (i.e. one of free lists 571*a-n*) and garbage collection list 575 (i.e. one of garbage collection lists 575*a-n*).

Figure 5A:
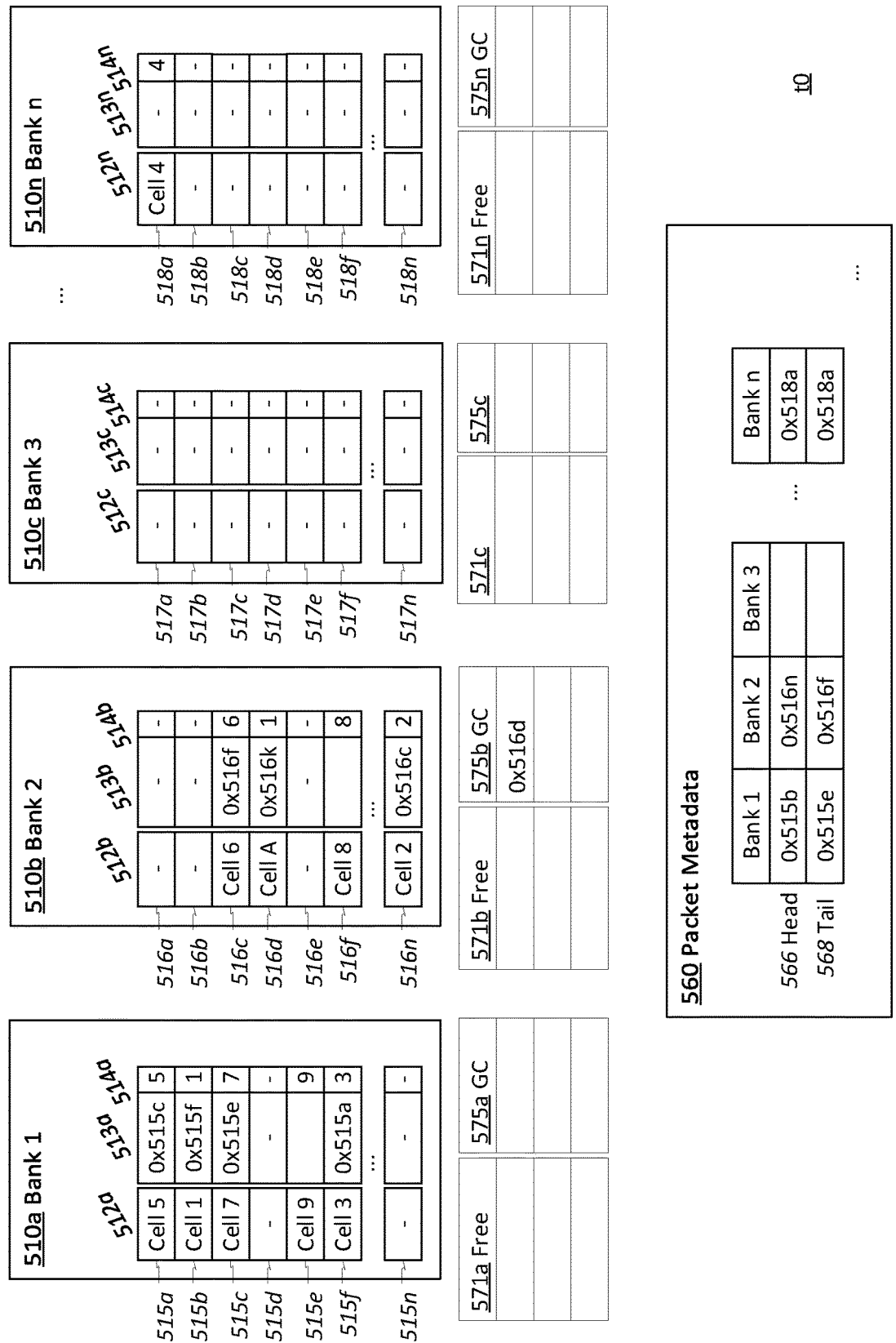
FIGS. 5A-5F illustrate the contents of example buffer-related memory structures as they are manipulated over time by garbage collection and related processes.
Figure 5B:
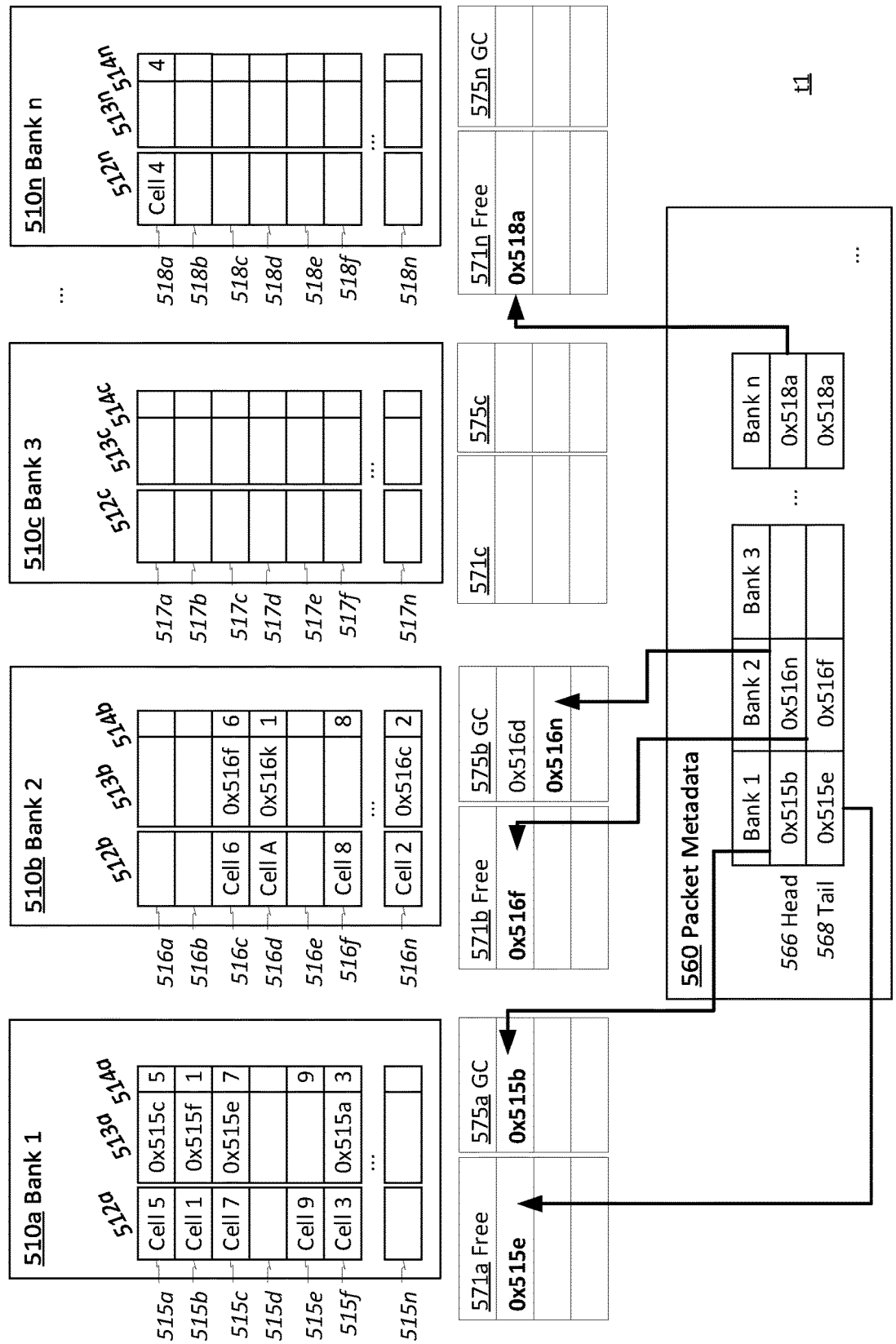

FIGS. 5A-5B also depict packet metadata 560 for an example packet. Packet metadata 560 may be an example of packet metadata 360 or 460. Packet metadata includes per-bank head addresses 566 and per-bank tail addresses 568. Other, undepicted metadata may also be stored, both in packet metadata 560 and in garbage collection list 575.

FIGS. 5A-5F depict a number of address fields that may, when filled, refer to various buffer entries 515-518. For simplicity, the addresses depicted take the form of 0xNNNa, where NNNa refers to the figure numeral of the corresponding addressable memory structure. It will be recognized that the actual addressing scheme used in embodiments will vary according to the nature of the memories being utilized.

FIG. 5A corresponds to a time t0 immediately prior to dropping the packet that corresponds to the packet metadata 560. This packet includes nine cells that have been buffered thus far, which are stored at various addresses in banks 510*a*, 510*b*, and 510*n*. Packet metadata 560 has been assembled as these cells have been stored, and bank head addresses 566 and tail addresses 568 are found for each of these banks (but not bank 510*c*) in packet metadata 560.

For illustrative purposes, garbage collection list 575*b* is depicted as already storing the head address of a garbage collection chain in bank 510*b*. This head address is for a packet that has already been dropped, and whose cells are still being freed. Of course, garbage collection lists 575, free list 571, and banks 510 may include a variety of other data for many other packets. Moreover, there may be packet metadata for many other packets. However, such detail has been omitted for ease of explanation.

FIG. 5B corresponds to a time t1 after the packet corresponding to packet metadata 560 has been dropped. Responsive to this event, head addresses 566 have been copied to the garbage collection lists 575 of their corresponding banks 510. Also, tail addresses 568 have been copied to the free lists 571 of their corresponding banks 510. However, the head address 566 for bank 510n has not been added to the garbage collection list 575n, since the head address 566 for bank 510n is the same as its tail address 568, and thus already in the free list 571n.

Figure 5C:
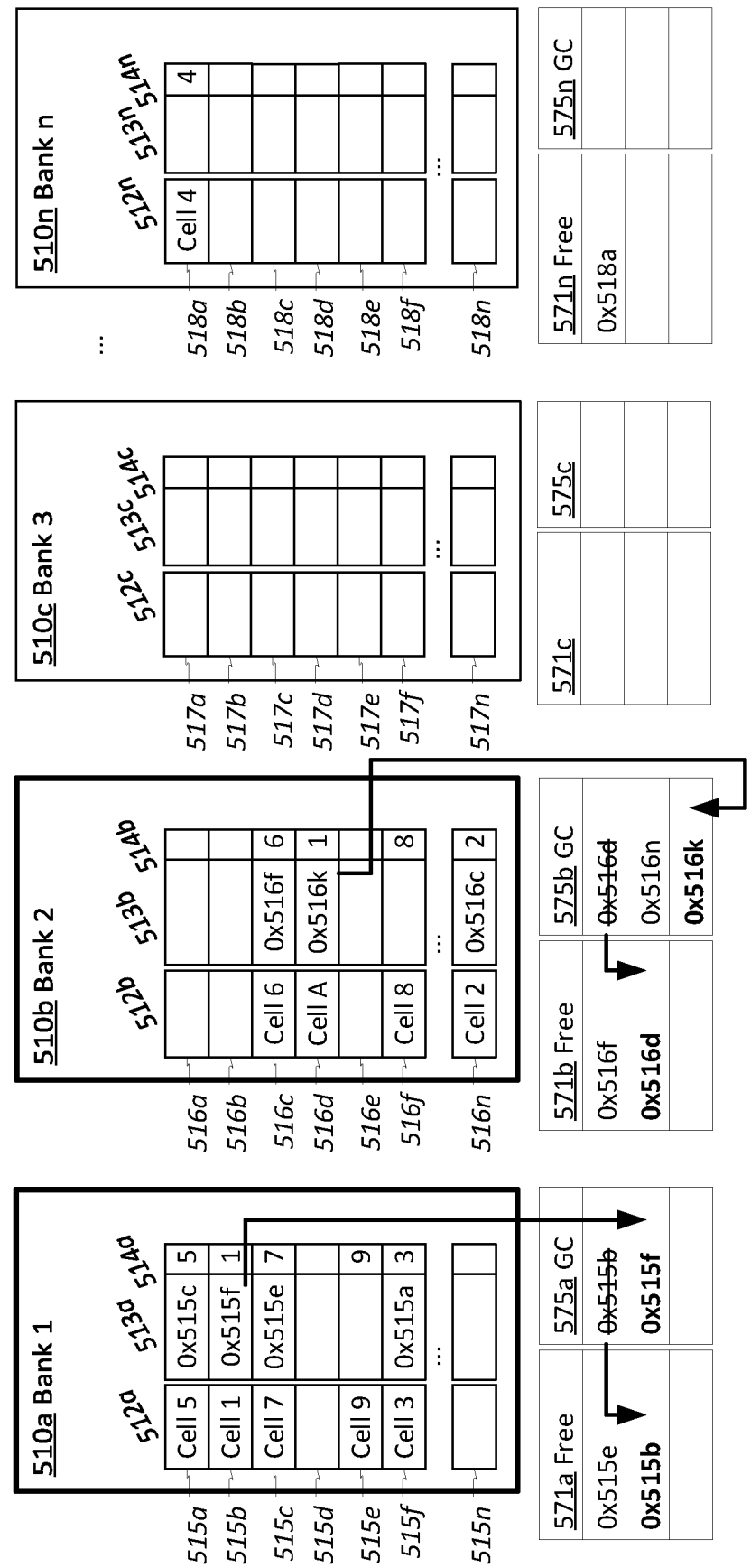

FIG. 5C corresponds to a time t2 after t1. At this time, a garbage collector has been able to process both of garbage collection lists 575a and 575b. The head addresses previously at the top of garbage collection lists 575a and 575b have been moved to free lists 571a and 571b, respectively. Meanwhile, next entry data 513 has been read for these head addresses and copied into the garbage collection lists 575a and 575b, respectively. Note that though FIG. 5C depicts the next entry addresses 513 as being added as new items in the garbage collection lists 575, the next entry addresses may in some embodiments actually replace the head addresses from which they were read.

Figure 5D:
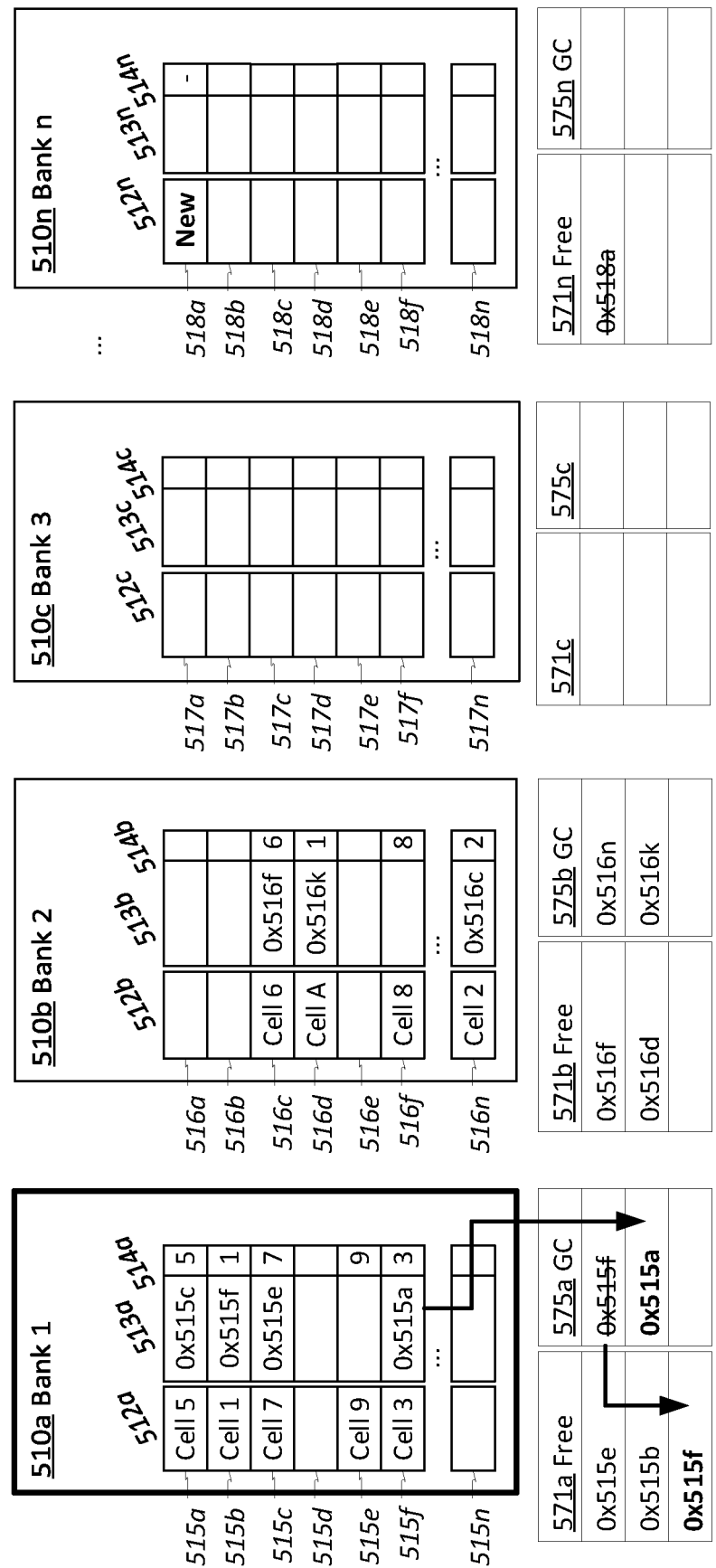

FIG. 5D corresponds to a time t3 after t2. At this time, a garbage collector has once again processed garbage collection list 575a, but has not processed garbage collection list 575b. This may be, for example, because the link memory in which next entry data 513 is stored has been locked by one or more other operations. As a result of performing garbage collection on queue 575a, another head address has been moved to free list 571a, and is replaced by its next entry data 513a. Meanwhile, an entry has been removed from free list 571n, on account of being allocated to store a cell for a new packet.

Figure 5E:
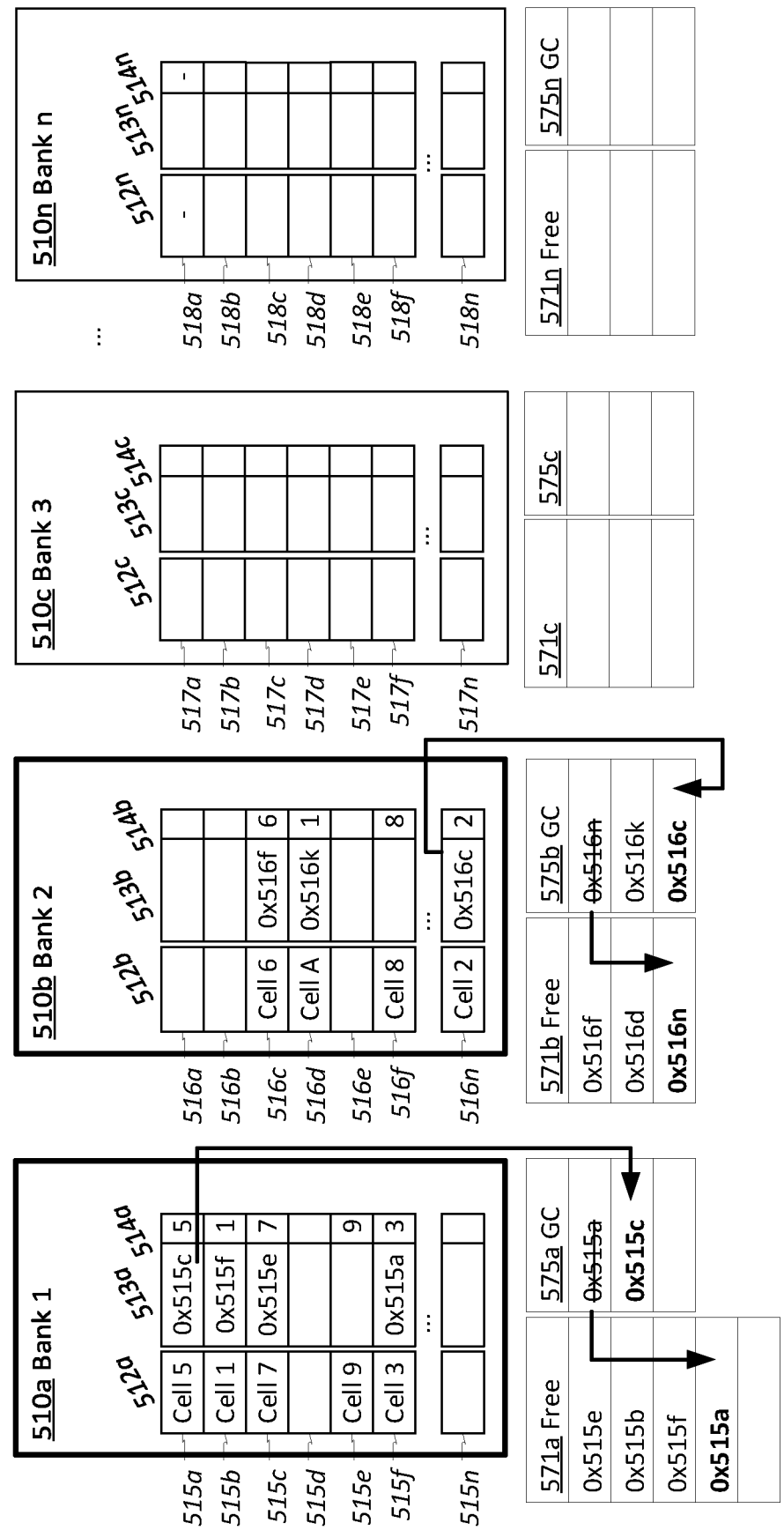

FIG. 5E corresponds to a time t4 after t3. At this time, a garbage collector has again been able to process both of garbage collection lists 575a and 575b. Again, another head address has been moved from garbage collection list 575a to free list 571a, and is replaced by its next entry data 513a. Similarly, another head address has been moved from garbage collection list 575b to free list 571b, and is replaced by its next entry data 513b.

Figure 5F:
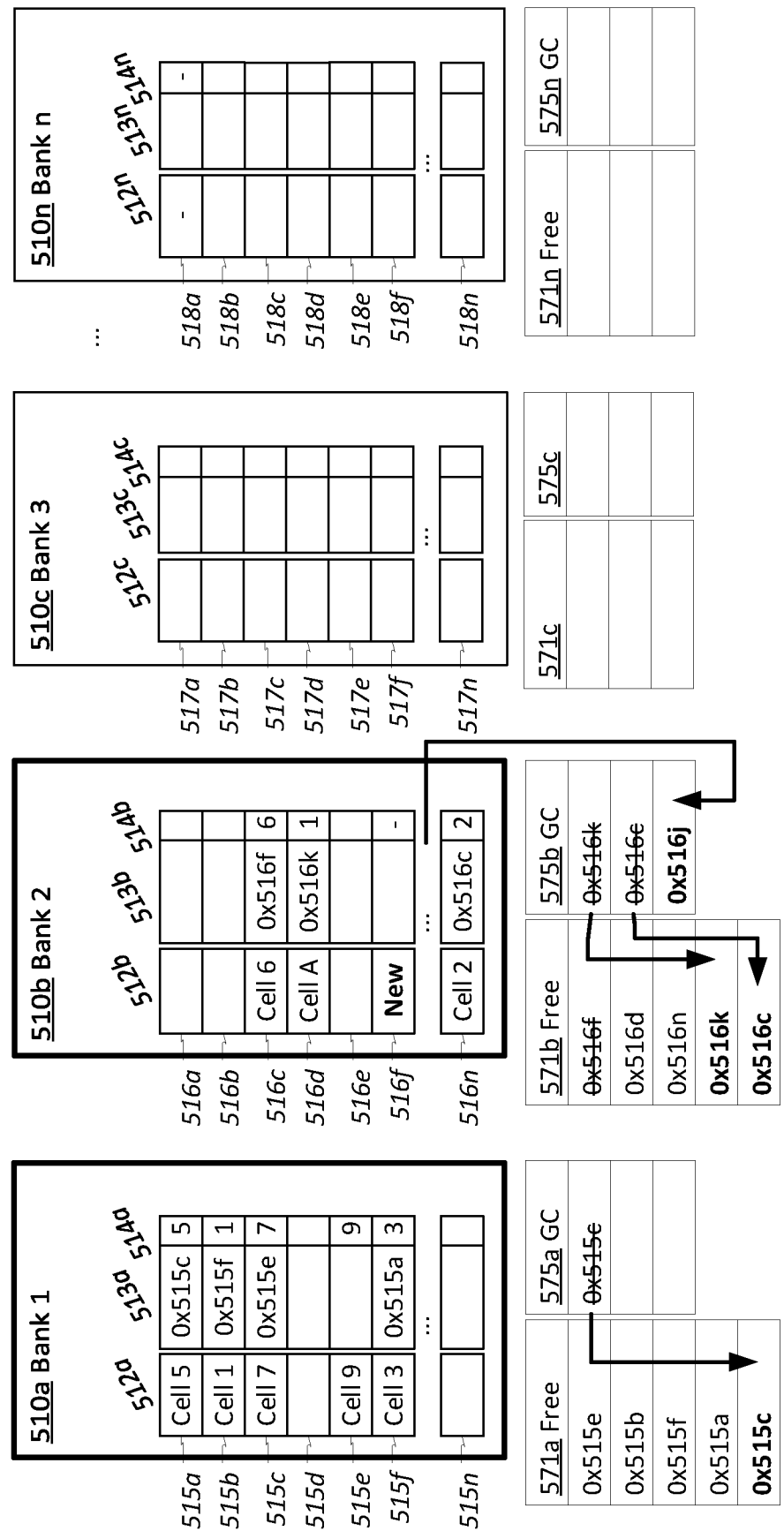

FIG. 5F corresponds to a time t5 after t4. Note that the exact intervals of time (and number of clock cycles) between each of FIGS. 5A-5F may differ between figures. For example, the interval between t4 and t5 may be greater than those between previously depicted times.

In the interval between times t4 and t5, a garbage collector has again processed garbage collection list 575a, moving its last remaining head address 0x515c to free list 571a. No new head address takes its place, as buffer entry 515c is the last unfreed entry in the packet's garbage collection chain for bank 510a. The garbage collector may be configured to recognize that entry 515c is the last unfreed entry by, for example, comparing the tail address 568 for bank 510a to the next entry address 513a for entry 515c.

Moreover, in the interval between times t4 and t5, a garbage collector has processed garbage collection list 575b twice. Again, head addresses have been moved from garbage collection list 575b to free list 571b. One of these head addresses has been replaced by a next entry. However, similar to entry 515c, the other head address, 0x516c is the end of its chain, and has not been replaced.

In this manner, each of the nine buffered cells of the packet corresponding to packet metadata 560 have now been freed for use to store other packet data. Moreover, another one of these entries, 516f, has been removed from free list 571b and is being used to store data for a new packet.

5.0. Example Embodiments

Examples of some embodiments are represented, without limitation, in the following clauses:

According to an embodiment, a system comprises: buffer memory banks configured to temporarily buffer data units received over a plurality of network interfaces; a traffic manager configured to select particular entries in particular buffer memory banks in which to store particular portions of the data units, the traffic manager further configured to write linking data that defines chains of entries within the buffer memory banks, each chain linking all of the entries in a single buffer memory bank that store data belonging to a same data unit; a garbage collector configured to free previously utilized entries in the buffer memory banks for use in storing data for newly received data units; one or more memories storing garbage collection lists for the buffer memory banks, each of the buffer memory banks having a different garbage collection list; wherein the garbage collector is configured to free previously utilized entries in part by gradually traversing particular chains of entries and freeing traversed entries, the garbage collection lists indicating to the garbage collector starting addresses of the particular chains; wherein the traffic manager is further configured to, in response to a determination to dispose of a given data unit, for each given buffer memory bank in at least a set of the buffer memory banks, write, to the given buffer memory bank's garbage collection list, data indicating a starting address of a chain of entries that store data for the given data unit in the given buffer memory bank.

In an embodiment, each of the data units is a packet and each entry of the buffer memory banks stores a packet cell.

In an embodiment, the starting address for a given chain of the particular chains is an address of a head entry within a given buffer memory bank for a given packet that has been disposed of, the given chain only including entries within the given buffer memory bank.

In an embodiment, the starting address for a given chain of the particular chains is an address of a last known entry for the given chain within a given buffer memory bank for a given packet that has been dropped, the given chain only including entries within the given buffer memory bank.

In an embodiment, the traffic manager is configured to write different portions of a given data unit to different buffer memory banks.

In an embodiment, the traffic manager is configured not to write consecutive portions of any data unit within a same buffer memory bank.

In an embodiment, the traffic manager is configured to write multiple portions of a same data unit to non-consecutive entries within a same buffer memory bank.

In an embodiment, the traffic manager is further configured to, in response to the determination to dispose of the given data unit, for each given buffer memory bank, immediately free a tail entry at the tail of the given buffer memory bank's chain of entries.

In an embodiment, the traffic manager is further configured, in response to the determination to dispose of the given data unit, not to copy the starting address for a chain whose head entry and its tail entry are a same entry.

In an embodiment, the linking data is stored in link memories, each buffer memory bank having a separate link memory for storing linking data specific to that buffer memory bank, each link memory accessible only a limited number of times in a given time period, the garbage collector configured to access the link memory for a given buffer memory bank to identify a next entry in a given chain within that given buffer memory bank only at a time when that link memory is not being accessed by other components of the system.

In an embodiment, each of the link memories is a separate, single-ported memory bank.

In an embodiment, each buffer memory bank is stored in a different memory than its link memory.

In an embodiment, the system further comprises: one or more memories storing free lists identifying entries within the buffer memory banks that are available to store data for new data units, each of the buffer memory banks having a different free list; wherein the traffic manager is configured to select the particular entries in which to store the particular portions using the free lists, the traffic manager removing the particular entries from the free lists once the particular entries are selected to store the particular portions; wherein freeing a buffer entry comprises adding the buffer entry to the free list of the buffer memory bank in which the buffer entry is found.

In an embodiment, the determination to dispose of the given data unit is a decision to drop the given data unit without sending the given data unit to a destination identified by the given data unit.

In an embodiment, the traffic manager is configured to determine to drop the given data unit based on determining that an entity associated with the given data unit is in a congested state.

In an embodiment, the system further comprises an accounting mechanism configured to determine that the entity is in a congested state based on counting numbers of buffer entries allocated to storing data associated with the entity.

In an embodiment, the garbage collector is configured to gradually free the particular chains by, iteratively, freeing starting entries at the starting addresses identified by the garbage collection lists, reading particular linking data associated with the starting addresses to identify addresses of next entries in the particular chains, and replacing the starting addresses with the addresses of the next entries in the particular chains until no further entries in the particular chains are left to be freed.

In an embodiment, the garbage collector frees entries for multiple chains at least partially concurrently.

In an embodiment, the system further comprises: one or more memories storing buffer counters corresponding to logical entities, the buffer counters indicating amounts of buffer space in the buffer memory banks consumed by non-freeable data associated with the corresponding logical entities; wherein the traffic manager is configured to store one or more entity identifiers associated with the given data unit in association with each starting address for the given data unit in the garbage collection lists; wherein the garbage collector is configured to decrement one or more of the buffer counters associated with the one or more entity identifiers when freeing each entry of each of the chains that store data for the given data unit.

In an embodiment, further comprises: one or more memories configured to store receive contexts, each of the receive contexts comprising metadata for a different specific data unit whose portions are currently being received, the metadata including, for each buffer memory bank in which at least one portion of the specific data unit is found, at least a head address and a tail address for a chain of entries within the buffer memory bank that stores data for the specific data unit; wherein the traffic manager is further configured the generate and update the receive contexts; wherein the traffic manager is further configured to, for the given buffer memory banks in which data for the given data unit is stored, copy the head address of the chain of entries for the given data unit within the given buffer memory bank from a given receive context for the given data unit to the given buffer memory bank's garbage collection list.

In an embodiment, the system further comprises one or more packet processors configured to utilize the linking data to determine correct orders in which to send or process the portions of individual data unit.

In an embodiment, the linking data further includes position data indicating positions of the portions within their corresponding data units.

In an embodiment, the determination to dispose of the given data unit is made prior to receiving at least one portion of the given data unit.

In an embodiment, the traffic manager is configured to not buffer any portions of the given data unit received after the determination.

In an embodiment, the system is an integrated circuit embedded within a network switch.

In an embodiment, the system is a networking device.

According to an embodiment, a method comprises: receiving data units over a plurality of network interfaces; temporarily buffering the received data units in buffer memory banks; selecting particular entries in particular buffer memory banks in which to store particular portions of a particular data unit; writing linking data that defines chains of entries within the particular buffer memory banks, each chain linking, for a different buffer memory bank of the buffer memory banks, all of the entries in that buffer memory bank that store data belonging to the particular data unit; storing garbage collection lists for the buffer memory banks, each of the buffer memory banks having a different garbage collection list; in response to a determination to dispose of the particular data unit, for each given buffer memory bank in at least a set of the buffer memory banks, writing, to the given buffer memory bank's garbage collection list, data indicating a starting address of a chain of entries that store data for the particular data unit in the given buffer memory bank; for each given buffer memory bank, based on the given buffer memory bank's garbage collection list and on the linking data for the given buffer memory bank, incrementally traversing certain entries in the chain of entries for the particular data unit in the given buffer memory bank and freeing the certain entries as the certain entries are traversed.

In an embodiment, incrementally traversing and freeing comprises: iteratively reading the starting address from the garbage collection list of the given buffer memory bank, adding the starting address to a list of freeable entries for the given buffer memory bank, reading particular linking data associated with the starting address to identify a next address in the chain of entries in the given buffer memory bank, and updating the starting address to be the next address, until no further entries in the chain are left to be freed.

In an embodiment, the method further comprises, in response to the determination to dispose of the particular data unit, immediately freeing tail entries at the tails of each chain of entries for the particular data unit.

In an embodiment, the linking data is stored in link memories, each buffer memory bank having a separate link memory for storing linking data specific to that buffer memory bank, each link memory accessible only a limited number of times in a given time period, wherein incrementally traversing comprises, only at times when the link memory is not locked for access for other operations, accessing the link memory for the given buffer memory bank to identify next entries in the chain of entries for the particular data unit within the given buffer memory bank.

In an embodiment, the method further comprises: storing free lists identifying entries within the buffer memory banks that are available to store data for new data units, each of the buffer memory banks having a different free list; selecting the particular entries in which to store the particular portions using the free lists, the traffic manager removing the particular entries from the free lists once the particular entries are selected to store the particular portions; wherein freeing a buffer entry comprises adding the buffer entry to the free list of the buffer memory bank in which the buffer entry is found.

In an embodiment, the determination to dispose of the particular data unit is a decision to drop the particular data unit without sending the particular data unit to a destination identified by the particular data unit.

In an embodiment, the method further comprises: storing buffer counters corresponding to logical entities, the buffer counters indicating amounts of buffer space in the buffer memory banks consumed by non-freeable data associated with the corresponding logical entities; storing one or more entity identifiers associated with the particular data unit in association with each starting address for the particular data unit in the garbage collection lists; decrementing one or more counters associated with the one or more entity identifiers when freeing each entry of each of the chains that store data for the particular data unit.

In an embodiment, the method further comprises: storing a receive context comprising metadata for the particular data unit as the particular data unit is being received, the metadata including, for each buffer memory bank in which at least one portion of the particular data unit is found, at least a head address and a tail address for the chain of entries within the buffer memory bank that stores data for the particular data unit; for each given buffer memory bank, copying the head address of the chain of entries for the particular data unit within the given buffer memory bank from a given receive context for the particular data unit to the given buffer memory bank's garbage collection list.

In an embodiment, the determination to dispose of the particular data unit is made prior to buffering at least one portion of the particular data unit.

for each given buffer memory bank, based on the given buffer memory bank's garbage collection list and on the linking data for the given buffer memory bank, incrementally traversing certain entries in the chain of entries for the particular data unit in the given buffer memory bank and freeing the certain entries as the certain entries are traversed.

Other examples of these and other embodiments are found throughout this disclosure.

6.0. Example Implementing System

FIG. 1 is an illustrative view of various aspects of an example networking system 100, also referred to as a network, in which the techniques described herein may be practiced, according to an embodiment. Networking system 100 comprises a plurality of interconnected nodes 110a-110n (collectively nodes 110), each implemented by a different computing device. For example, a node 110 may be a single networking computing device, such as a router or switch, in which some or all of the processing components described herein are implemented in application-specific integrated circuits (ASICs), field programmable gate arrays (FPGAs), or other integrated circuit(s). As another example, a node 110 may include one or more memories storing instructions for implementing various components described herein, one or more hardware processors configured to execute the instructions stored in the one or more memories, and various data repositories in the one or more memories for storing data structures utilized and manipulated by the various components.

In an embodiment, some or all of nodes 110 may include a system 300 and/or the memory structures of FIG. 4. In an embodiment, some or all of the nodes 110 may implement flows 600-800, regardless of whether the nodes 110 include all of the components of system 300 and/or the memory structures in FIG. 4. In other embodiments, however, the techniques described herein may be practiced without all of the details of FIG. 1.

Each node 110 is connected to one or more other nodes 110 in network 100 by one or more communication links, depicted as lines between nodes 110. The communication links may be any suitable wired cabling or wireless links. Note that system 100 illustrates only one of many possible arrangements of nodes within a network. Other networks may include fewer or additional nodes 110 having any number of links between them.

6.1. Network Packets

While each node 110 may or may not have a variety of other functions, in an embodiment, each node 110 is configured to send, receive, and/or relay data to one or more other nodes 110 via these links. In general, data is communicated as series of discrete units or structures of data represented by signals transmitted over the communication links.

Different nodes 110 within a network 100 may send, receive, and/or relay data units at different communication levels, or layers. For instance, a first node 110 may send a data unit at the network layer (e.g. a TCP segment) to a second node 110 over a path that includes an intermediate node 110. This data unit will be broken into smaller data units ("subunits") at various sublevels before it is transmitted from the first node 110. For example, the data unit may be broken into packets, then cells, and eventually sent out as a collection of signal-encoded bits to the intermediate device. Depending on the network type and/or the device type of the intermediate node 110, the intermediate node 110 may rebuild the entire original data unit before routing the information to the second node 110, or the intermediate node 110 may simply rebuild the subunits (e.g. packets or frames) and route those subunits to the second node 110 without ever composing the entire original data unit.

When a node 110 receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node 110 is not the destination for the data unit, the node may look up the destination node 110 within receiving node's routing information and route the data unit to another node 110 connected to the receiving node 110 based on forwarding instructions associated with the destination node 110 (or an address group to which the destination node belongs). The forwarding instructions may indicate, for instance, an outgoing port over which to send the packet, a label to attach the packet, etc. In cases where multiple paths to the destination node 110 are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. In an embodiment, the source of the traffic flow may mark each data unit in the sequence as a member of the flow using a label, tag, or other suitable identifier within the data unit. In another embodiment, the flow is identified by deriving an identifier from other fields in the data unit (e.g. a "five-tuple" combination of a source address, source port, destination address, destination port, and protocol). A flow is often intended to be sent in sequence, and network devices are therefore typically configured to send all data units within a given flow along a same path to ensure that the flow is received in sequence.

For convenience, many of the techniques described in this disclosure are described with respect to routing IP packets in an L3 (level 3) network, or routing cells and frames thereof in an L2 (level 2) network, in which contexts the described techniques have particular advantages. It will be recognized, however, that these techniques may also be applied to realize advantages in routing other types of data units conforming to other protocols and/or at other communication layers within a network. Thus, unless otherwise stated or apparent, the terms "data unit" and "packet" as used herein should be understood to refer to any type of data structure communicated across a network, including packets as well as segments, cells, data frames, datagrams, and so forth.

6.2. Network Paths

Any node in the depicted network 100 may communicate with any other node in the network 100 by sending packets through a series of nodes 110 and links, referred to as a path. For example, Node B (110b) may send packets to Node H (110h) via a path from Node B to Node D to Node E to Node H. There may be a large number of valid paths between two nodes. For example, another path from Node B to Node H is from Node B to Node D to Node G to Node H.

In an embodiment, a node 110 does not actually need to specify a full path for a packet that it sends. Rather, the node 110 may simply be configured to calculate the best path for the packet out of the device (e.g. which egress port it should send the packet out on). When a node 110 receives a packet that is not addressed directly to the node 110, based on header information associated with a packet, such as path and/or destination information, the node 110 relays the packet along to either the destination node 110, or a "next hop" node 110 that the node 110 calculates is in a better position to relay the packet to the destination node 110. In this manner, the actual path of a packet is product of each node 110 along the path making routing decisions about how best to move the packet along to the destination node 110 identified by the packet.

6.3. Network Device

Figure 2:
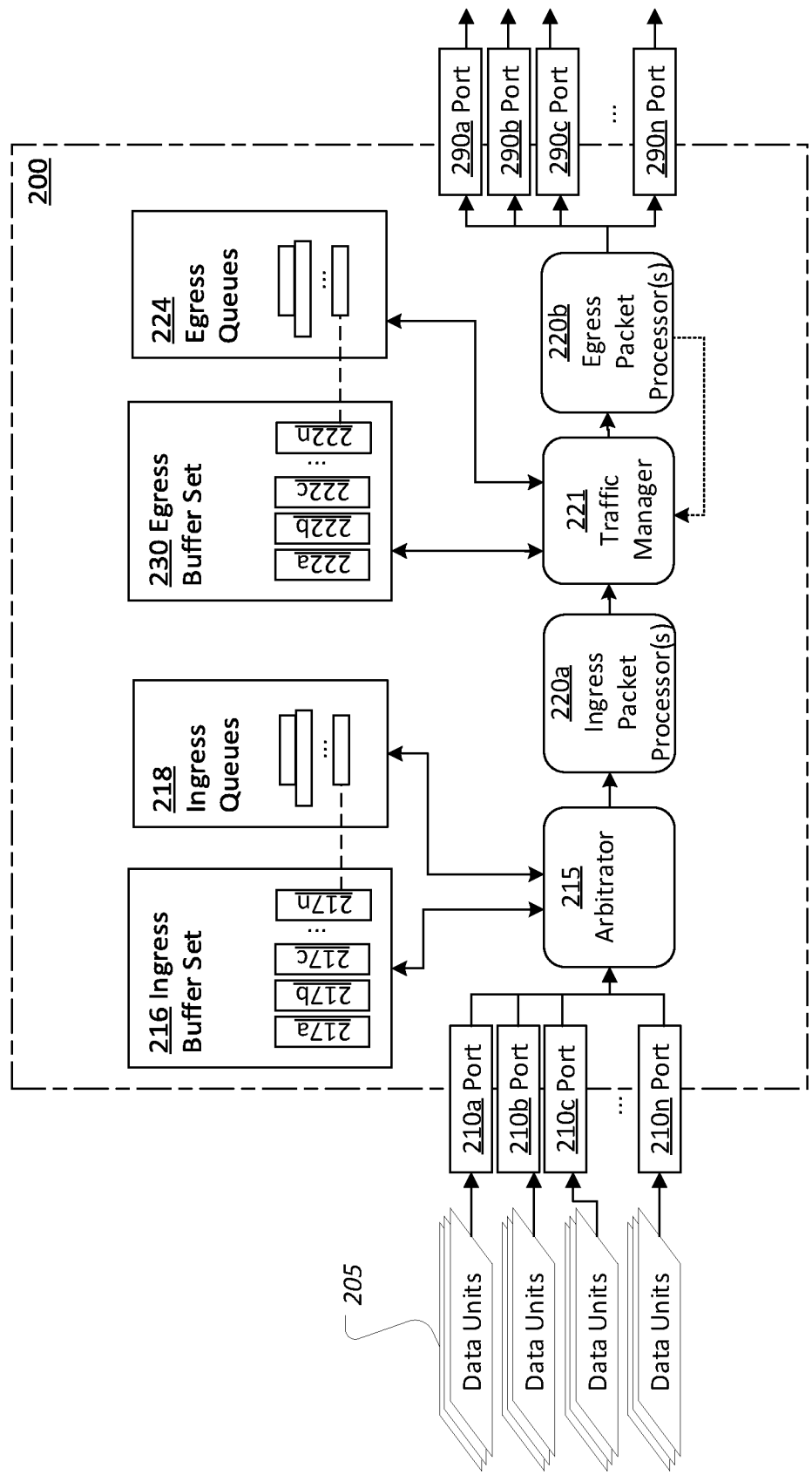
FIG. 2 is an illustrative view of various aspects of an example network device in which techniques described herein may be practiced.

FIG. 2 is an illustrative view of various aspects of an example network device 200 in which techniques described herein may be practiced, according to an embodiment. Network device 200 is a computing device comprising any combination of hardware and software configured to implement the various logical components described herein, including components 210-290. Note that, in an embodiment, some or all of the nodes 110 in system 100 may each be a separate network device 200.

In another embodiment, device 200 may be one of a number of components in a node 110. For instance, network device 200 may be an integrated circuit, or "chip," dedicated to performing switching and/or routing functions within a network switch or router. The network switch or router may further comprise one or more central processor units, storage units, memories, physical interfaces, LED displays, or other components external to the chip, some or all of which may communicate with the chip. The network switch or router may even include multiple devices 200.

6.4. Ports

Network device 200 includes ports 210/290. Ports 210, including ports 210a-n, are inbound ("ingress") ports by which data units 205 are received over a network, such as network 110. Ports 290, including ports 290a-n, are outbound ("egress") ports by which at least some of the packets 205 are sent out to other destinations within the network, after having been processed by the network device 200.

Data units 205 may be packets, cells, frames, or other suitable structures. In many embodiments, the individual atomic data units 205 upon which the depicted components typically operate are cells or frames. That is, data units are received, acted upon, and transmitted at the cell or frame level. These cells or frames are logically linked together as the packets to which they respectively belong for purposes of determining how to handle the cells or frames. However, the cells or frames may not actually be assembled into packets within device 200, particularly if the cells or frames are being forwarded to another destination through device 200.

Ports 210/290 are depicted as separate ports for illustrative purposes, but may actually correspond to the same physical hardware ports (e.g. network jacks or interfaces) on the network device 210. That is, a network device 200 may both receive data units 205 and send data units 205 over a single physical port, and the single physical port may thus function as both an ingress port 210 and egress port 290. Nonetheless, for various functional purposes, certain logic of the network device 200 may view a single physical port as a separate ingress port 210 and egress port 290. Moreover, for various functional purposes, certain logic of the network device 200 may subdivide a single physical ingress port or egress port into multiple ingress ports 210 or egress ports 290, or aggregate multiple physical ingress ports or multiple egress ports into a single ingress port 210 or egress port 290. Hence, in various embodiments, ports 210 and 290 should be understood as distinct logical constructs that are mapped to physical ports rather than simply as distinct physical constructs.

In some embodiments, the ports 210/290 of a device 200 may be coupled to one or more transceivers, such as Serializer/Deserializer ("SerDes") blocks. For instance, ports 210 may provide parallel inputs of received data units into a SerDes block, which then outputs the data units serially into an ingress packet processor 220*a*. On the other end, an egress packet processor 220*b* may input data units serially into another SerDes block, which outputs the data units in parallel to ports 290. There may be any number of input and output SerDes blocks, of any suitable size, depending on the specific implementation (e.g. four groups of 4×25 gigabit blocks, eight groups of 4×100 gigabit blocks, etc.).

6.5. Packet Processors

A device 200 comprises one or more packet processing components 220, such as the depicted ingress packet processor 220*a* and egress packet processor 220*b*, that collectively implement forwarding logic by which the device 200 is configured to determine how to handle each packet the device 200 receives. These packet processors 220 may be any suitable combination of fixed circuitry and/or software-based logic, such as specific logic components implemented by one or more Field Programmable Gate Arrays (FPGAs) or Application-Specific Integrated Circuits (ASICs), or a general-purpose processor executing software instructions.

Different packet processors 220 may be configured to perform different packet processing tasks. For instance, some packet processors may forward data units 205 out egress ports 290, other packet processors 220 may implement flow control mechanisms, other packet processors 220 may perform statistical collection or debugging tasks, and so forth. A device 200 may comprise any number of packet processors 220 configured to perform any number of processing tasks.

In an embodiment, the packet processors 220 of a device 200 are arranged such that the output of one packet processor 220 is, eventually, input into another processor 220, in such a manner as to pass data units 205 from certain packet processor(s) 220 to other packet processor(s) 220 in a sequence of stages, until finally disposing of the data units 205 (e.g. by sending the out an egress port 290, "dropping" packets, etc.). The exact set and/or sequence of packet processors 220 that process a given data unit 205 may vary, in some embodiments, depending on the attributes of the data unit 205 and/or the state of the device 200.

Ingress and Egress Processors

In an embodiment, a packet processor 220 may be generally classified as an ingress packet processor 220*a* or an egress packet processor 220*b*. Generally speaking, an ingress packet processor 220*a* performs certain intake tasks on data units 205 as they arrive. These intake tasks may include, for instance, and without limitation, parsing data units 205, performing routing related lookup operations, categorically blocking data units 205 with certain attributes and/or when the device 200 is in a certain state, duplicating certain types of packets, making initial categorizations of packets, and so forth. In an embodiment, there may be fewer ingress packet processors 220*a* relative to egress packet processor(s) 220*b*, or even just one ingress packet processor 220*a*.

The egress packet processor(s) 220*b* of a device 200, by contrast, are configured to perform all non-intake tasks necessary to implement the forwarding logic of the device 200. These tasks may include, for example, tasks such as identifying paths along which to forward packets, implementing flow control and/or other policies, manipulating packets, performing statistical or debugging operations, and so forth. In an embodiment, there may be different egress packet processors(s) 220*b* assigned to different flows or other categories of traffic, such that not all data units 205 will be processed by the same egress packet processor 220*b*.

In an embodiment, multiple egress packet processor(s) 220*b* may be chained together such that a data unit 205 processed by a first egress packet processor 220*b* is later processed by a second egress packet processor 220*b* configured to send the data unit 205 out a specific port 290. There is no limit to the number of packet processor(s) 220*b* within such a chain.

Forwarding Logic and Tables

As mentioned, the packet processors 220 collectively implement the forwarding logic of a device 200. The forwarding logic of a device 200, or portions thereof, may, in some instances, be hard-coded into the packet processors 220. For instance, the device 200 may be configured to always react to certain types of data units in certain circumstances in a certain way. The forwarding logic, or portions thereof, may also be configurable, in that the logic changes over time in response to data collected from or instructions received from other nodes in the network in which the device 200 is located.

For example, a device 200 will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component. For instance, such attributes or characteristics may include a Quality-of-Service level specified by the data unit or associated with another characteristic of the data unit, a flow control group, an ingress port 210 through which the data unit was received, a tag or label in a packet's header, a source address, a destination address, a packet type, or any other suitable distinguishing property.

In an embodiment, forwarding logic may read port state data. Port state data may include, for instance, flow control state information describing various traffic flows and associated traffic flow control rules or policies, link status information indicating links that are up or down, port utilization information indicating how ports are being utilized (e.g. utilization percentages, utilization states, etc.). Forwarding logic may be configured to implement the associated rules or policies associated with the flow(s) to which a given packet belongs.

As data units are routed through different nodes in a network, the nodes may, on occasion, discard, fail to send, or fail to receive data units, thus resulting in the data units failing to reach their intended destination. The act of discarding of a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies.

According to an embodiment, the forwarding logic reads certain instructions for handling network traffic from one or more tables. Generally, the tables describe groups of one or more addresses, such as subnets of IPv4 or IPv6 addresses. Each address is an address of a network device on a network, though a network device may have more than one address. Each group is associated with a potentially different set of one or more actions to execute with respect to data units that resolve to (e.g. are directed to) an address within the group. Any suitable set of one or more actions may be associated with a group of addresses, including without limitation, forwarding a message to a specified "next hop," duplicating the message, changing the destination of the message, dropping the message, performing debugging or statistical operations, applying a quality of service policy or flow control policy, and so forth.

For illustrative purposes, these tables are described as "forwarding tables," though it will be recognized that the extent of the action(s) described by the tables may be much greater than simply where to forward the message. For example, in an embodiment, a table may be a basic forwarding table that simply specifies a next hop for each group. In other embodiments, a table may describe one or more complex policies for each group. Moreover, there may be different types of tables for different purposes. For instance, one table may be a basic forwarding table that is compared to the destination address of each packet, while another table may specify policies to apply to packets upon ingress based on their destination (or source) group, and so forth.

In an embodiment, system 200 comprises path management control logic that is configured to adjust the forwarding instructions described by a forwarding table based on a variety of factors. For example, path management control logic may be configured to recognize administrative commands that explicitly instruct the path management control logic to add or remove address groups or adjust existing instructions for a group. Path management control logic may also adjust forwarding instructions in response to events that imply changes to the forwarding instructions, such as the receipt of data units that announce the availability of new paths in a network, the dropping of a certain number of packets to a destination, the application of certain flow control measures, or any other suitable event.

In an embodiment, groups of addresses are described using an address prefix. This prefix is, in essence, a beginning address portion that is common to each address in the group. The beginning address portion may be, for instance, a first number of bits, bytes, or other element. As used herein, a "prefix entry" generally refers to a data entry (i.e. in a forwarding table) which maps a particular prefix to one or more actions to be performed with respect to network packets or other data structures associated with an input key (e.g. address) that matches the particular prefix. Thus, when determining how to handle a certain packet, forwarding logic may determine a group of addresses that a data packet is associated with (e.g. a destination subnet, source subnet, etc.) using a prefix, and perform the one or more actions associated with that group.

6.6. Buffers

Since not all data units 205 received by the device 200 can be processed by the packet processor(s) 220 at the same time, various components of device 200 may temporarily store data units 205 in memory structures referred to as buffers while the data units 205 are waiting to be processed. For example, a certain packet processor 220 may only be capable of processing a certain number of data units 205, or portions of data units 205, in a given clock cycle, meaning that other data units 205, or portions of data units 205, must either be ignored (i.e. dropped) or stored. At any given time, a large number of data units 205 may be stored in the buffers of the device 200, depending on network traffic conditions.

Each buffer may be a portion of any type of memory, including volatile memory and/or non-volatile memory. In an embodiment, each buffer is a distinct single-ported memory, supporting only a single input/output (I/O) operation per clock cycle (i.e. either a single read operation or a single write operation). Single-ported memories may be utilized for higher operating frequency, though in other embodiments multi-ported memories may be used instead. In an embodiment, each of these buffers is capable of being accessed concurrently with each other buffer in a same clock cycle, though full realization of this capability is not necessary. In an embodiment, each buffer is a distinct memory bank, or set of memory banks. In yet other embodiments, a buffer may be a region within a memory bank. In an embodiment, each buffer comprises many addressable "slots" or "entries" (e.g. rows, columns, etc.) in which data units 205, or portions thereof, may be stored.

A device 200 may include a variety of buffers or sets of buffers, each utilized for varying purposes and/or components. Generally, a data unit awaiting processing by a component is held in a buffer associated with that component until it is "released" to the component for processing.

A component that utilizes one or more buffers may include a buffer manager configured to manage use of those buffer(s). Among other processing tasks, the buffer manager may, for example, allocate and deallocate specific segments of memory for buffers, create and delete buffers within that memory, identify available buffer entries in which to store a data unit 205, maintain a mapping of buffers entries to data units 205 stored in those buffers entries (e.g. by a packet sequence number assigned to each packet when the first data unit 205 in that packet was received), mark a buffer entry as available when a data unit 205 stored in that buffer is dropped, sent, or released from the buffer, determine when a data unit must be dropped because it cannot be stored in a buffer, perform garbage collection on buffer entries for data units 205 (or portions thereof) that are no longer needed, and so forth.

A buffer manager may include buffer assignment logic. The buffer assignment logic is configured to identify which buffer should be utilized to store a given data unit 205, or portion thereof. In some embodiments, each packet is stored in a single entry within its assigned buffer. In yet other embodiments, a packet is received as, or divided into, constituent data units such as fixed-size cells or frames. The buffers may store these constituent data units separately (e.g. not in the same location, or even the same buffer).

In some embodiments, the buffer assignment logic is relatively simple, in that data units are assigned to buffers randomly or using a round-robin approach. In some embodiments, data units 205 are assigned at least partially based on characteristics of those data units 205, such as corresponding traffic flows, destination addresses, source addresses, ingress ports, and/or other metadata. For example, different buffers or sets of buffers may be utilized to store data units received from different ports or sets of ports. In an embodiment, the buffer assignment logic also or instead utilizes buffer state information, such as utilization metrics, to determine which buffer to assign to a data unit. Other assignment considerations may include buffer assignment rules (e.g. no writing two consecutive cells from the same packet to the same buffer) and I/O scheduling conflicts (e.g. to avoid assigning a data unit to a buffer when there are no available write operations to that buffer on account of other components reading content already in the buffer).

6.7. Queues

In an embodiment, to manage the order in which data units 205 are processed from the buffers, various components of a device 200 may implement queuing logic. Each data unit 205, or the buffer locations(s) in which it is stored, is said to belong to one or more constructs referred to as queues. Typically, a queue is a set of memory locations (i.e. in the buffers) arranged in some order by metadata describing the queue. The memory locations may (and often are)

non-contiguous relative to their addressing scheme and/or physical arrangement. For example, the metadata for one queue may indicate that the queue is comprised of, in order, entries 1, 50, 3, and 92 in a certain buffer.

The sequence in which the queue arranges its constituent data units 205 generally corresponds to the order in which the data units 205 in the queue will be released and processed. In some embodiments, the number of data units 205 assigned to a given queue at a given time may be limited, either globally or on a per-queue basis, and this limit may change over time.

6.8. Egress Traffic Management

According to an embodiment, a device 200 includes one or more traffic managers 221 configured to control the flow of data units from the ingress packet processor(s) 220a to the egress packet processor(s) 220b. Device 200 may include egress buffers 222, depicted in FIG. 2 as individual buffers 222a-n, which collectively form an egress buffer memory 230. A buffer manager within the traffic manager 221 may temporarily store data units 205 in buffers 222 as they await processing by egress processor(s) 220b. The number of egress buffers 222 may vary depending on the embodiment. In an embodiment, the traffic manager 221 is coupled to the ingress packet processor(s) 220a, such that data units 205 (or portions thereof) are assigned to buffers 222 only upon being initially processed by an ingress packet processor 220a. Once in an egress buffer 222, a data unit 205 (or portion thereof) may be "released" to one or more egress packet processor(s) 220b for processing, either by the traffic manager 221 sending a link or other suitable addressing information for the corresponding buffer 222 to the egress packet processor 220b, or by sending the data unit 205 directly.

Beyond managing the use of buffers 222 to store data units 205 (or copies thereof), the traffic manager 221 may include queuing logic configured to assign buffer entries to queues 224 and manage the flow of data units 205 through the queues 224. The traffic manager 221 may, for instance, identify a specific queue 224 to assign a data unit 205 to upon ingress of the data unit 205. The traffic manager 221 may further determine when to release—also referred to as "dequeuing"—data units 205 (or portions thereof) from queues 224 and provide that data to specific packet processor(s) 220. The traffic manager 221 may further "deallocate" entries in buffer 222 that are no longer being utilized when the data stored within those entries are dequeued from their respective queues. These entries are then reclaimed for use in storing new data through a garbage collection process.

In an embodiment, different queues 224 may exist for different destinations. For example, each port 210 and/or port 290 may have its own set of queues 224. The queue 224 to which a data unit 205 is assigned may, for instance, be selected based on forwarding information indicating which port 290 the packet should depart from. In an embodiment, a different packet processor 220b may be associated with each different set of one or more queues 224. In an embodiment, the current processing context of the data unit 205 may be used to select which queue 224 a data unit 205 should be assigned to.

In an embodiment, there may also or instead be different queues 224 for different flows or sets of flows. That is, each identifiable traffic flow or group of traffic flows is assigned its own set of queues 224 to which its data units 205 are respectively assigned. In an embodiment, different queues 224 may correspond to different classes of traffic or quality-of-service (QoS) levels. Different queues 224 may also or instead exist for any other suitable distinguishing property of the data units 205, such as source address, destination address, packet type, and so forth.

For instance, a data unit 205 may be forwarded to another queue 224 associated with another processing stage implemented by another set of processing components, sent out of the device 200 over an outbound port 290, discarded, delayed for flow control reasons, and so forth. The collective actions of these processing components over these multiple stages is said to implement the forwarding logic of the device 200.

Though only one packet processor 220b and a single traffic manager 221 are depicted, a device 200 may comprise any number of packet processors 220b and traffic managers 221. For instance, different sets of ports 210 and/or ports 290 may have their own traffic manager 221 and packet processors 220. As another example, in an embodiment, the traffic manager 221 may be duplicated for some or all of the stages of processing a data unit. For example, system 200 may include a traffic manager 221 and egress packet processor 220b for an egress stage performed upon the data unit 205 exiting the system 200, and/or a traffic manager 221 and packet processor 220 for any number of intermediate stages. The data unit 205 may thus pass through any number of traffic managers 221 and/or egress packet processors 220b prior to exiting the system 200. In other embodiments, only a single traffic manager 221 is needed. If intermediate processing is needed, flow of a data unit 205 may "loop back" to the traffic manager 221 for buffering and/or queuing after each stage of intermediate processing.

An example flow of a data unit 205 through device 200 is as follows. The data unit 205 may be received by a port 210. The data unit 205 is then processed by an ingress packet processor 220a, and then delivered to a traffic manager 221. Traffic manager 221 stores the data unit 205 in a buffer 222 and assigns the data unit 205 to a queue 224. Traffic manager 221 manages the flow of the data unit 205 through the queue 224 until the data unit 205 is released to an egress packet processor 220b. Depending on the processing, the traffic manager 221 may then assign the data unit 205 to another queue 224 so that it may be processed by yet another processor 220, or the packet processor 220b may send the data unit 205 out another port 290.

In the course of processing a data unit 205, a device 200 may replicate a data unit 205 one or more times. For example, a data unit 205 may be replicated for purposes such as multicasting, mirroring, debugging, and so forth. Thus, a single data unit 205 may be replicated to multiple queues 224. Hence, though certain techniques described herein may refer to the original data unit 205 that was received by the device 200, it will be understood that those techniques will equally apply to copies of the data unit 205 that have been generated for various purposes. A copy of a data unit 205 may be partial or complete. Moreover, there may be an actual physical copy of the data unit 205 in buffers 222, or a single copy of the data unit 205 may be linked from a single buffer location 222 to multiple queues 224 at the same time.

6.9. Arbitrator

According to embodiments, system 200 further includes one or more arbitration components, or arbitrators, 215, deployed in front of ingress processor(s) 220a. Arbitrator 215 is coupled to an ingress buffer memory 216 comprising ingress buffers 217a-n (collectively ingress buffers 217). Arbitrator 215 may utilize buffers 217 to temporarily store incoming data units 205 before sending them to an ingress packet processor 220a. Arbitrator 215 may be configured to always store incoming data units 205 in buffers 217, or only when needed to avoid potential drops at oversaturated downstream components.

Each data unit 205 is stored in one or more entries within one or more buffers 217, which entries are marked as utilized to prevent newly received data units 205 from overwriting data units 205 that are already buffered. After a data unit 205 is released to an ingress processor 220a, the one or more entries in which a data unit 205 is buffered may then marked as available for storing new data units 205.

Buffer memory 216 may be a same or different memory than buffer memory 230. In embodiments where buffer memory 216 and 230 are the same, ingress buffers 217 and egress buffers 222 may be different portions of that same memory, allocated to ingress and egress operations, respectively.

In an embodiment, buffers 217 and 222 may in fact include at least some of the same physical buffers, and be separated only from a logical perspective. In such an embodiment, metadata or internal markings may indicate whether a given individual buffer entry belongs to an ingress buffer 217 or egress buffer 222. To avoid contention when distinguished only in the logical sense, ingress buffers 217 and egress buffers 222 may be allotted a certain number of entries in each of the physical buffers that they share, and the number of entries allotted to a given logical buffer is said to be the size of that logical buffer. In some such embodiments, instead of copying the data unit from an ingress buffer entry to an egress buffer entry as it transitions through system 200, the data unit may remain in the same buffer entry, and the designation of the buffer entry (e.g. as belonging to an ingress queue versus an egress queue) changes with the stage of processing.

Arbitrator 215 may release a center number of data units from buffers 217 to ingress packet processor(s) 220a each clock cycle or other defined period of time. The next entry to release may be identified using one or more ingress queues 218. For instance, each ingress port 210 or group of ports 210 may be assigned an ingress queue 218. Ingress queues 218 may be, for example, first-in-first-out queues. That is, when deciding which data unit 205 in a queue 218 to release next, the data unit that has been in the queue 218/buffers 217 the longest is selected.

In embodiments with multiple queues 218, a variety of mechanisms may be utilized to identify the next queue 218 from which to release a data unit 205. For example, each queue 218 may be assigned one or more slots each clock cycle (or other defined time period), and the next queue 218 may be selected using a round-robin approach that rotates through these slots. As another example, the next queue 218 may be selected using a random, or probabilistic approach. In an embodiment, each queue 218 may be weighted by an advertised transmission rate. For instance, for every one packet released from a queue 218 for a 100 Mbps port, ten might be released from a queue for a 1 Gbps port. The length and/or average age of a queue 218 might also or instead be utilized to prioritize queue selection. In an embodiment, a downstream component may instruct the arbitrator 215 to release data units from certain ports. Hybrid approaches may be used. For example, one of the longest queues 218 may be selected each odd clock cycle, and a random queue 218 may be selected every even clock cycle. In an embodiment, a token-based mechanism is utilized, as described in other sections.

Yet other queue selection mechanisms are also possible. The techniques described herein are not specific to any one of these mechanisms, unless otherwise stated.

In an embodiment, queues 218 may also or instead exist for specific groups of related traffic, also referred to as priority sets or classes of service. For instance, all data units carrying VoIP traffic might be assigned to a first queue 218, while all data units carrying Storage Area Network ("SAN") traffic might be assigned to a different queue 218. Each of these queues 218 might be weighted differently, so as to prioritize certain types of traffic over other traffic. Moreover, there may be different queues 218 for specific combinations of ports and priority sets.

6.10. Accounting Mechanisms

System 200 includes one or more accounting mechanisms configured to, among other tasks, monitor the use of buffers 217 and/or 222 and generate buffer count information based thereon. The accounting mechanisms maintain counts that indicates the number of buffer entries and/or amount of buffer space utilized by or available to each of a number of defined logical or physical "entities." The entities may include, without limitation, constructs such as ingress ports, ingress queues, priority sets, and/or traffic classes. The buffer count information may be stored in any suitable storage location, and/or communicated to other components periodically or upon request. In an embodiment, such an accounting mechanism is included in or coupled to arbitrator 215, for use in accounting for buffer usage in the ingress buffer set 216. In an embodiment, such an accounting mechanism may also be included in or coupled to the traffic manager 221 for use in accounting for buffer usage in the egress buffer set 230.

In some embodiments, an accounting mechanism that reports the per-entity counts in real-time may be expensive to implement, particularly where many entities are tracked. To reduce the expense of the accounting mechanism, the accounting mechanism may only update count information at intermittent times (e.g. once every ten clock cycles, once every twenty clock cycles, etc.). The accounting mechanism may, for instance, determine and report updated buffer count information for only a small subset of the entities each clock cycle, with the subset being chosen using a round robin approach and/or based on which entities exhibit a high level of recent activity. Alternatively, or additionally, the accounting mechanism may resolve only an approximate utilization for an entity.

6.11. Garbage Collectors

System 200 may include one or more garbage collectors coupled to one or more of the buffer sets 216 and 230. A separate garbage collector may exist for each set of buffers, or a single garbage collector may exist for multiple buffer sets. A garbage collector may, depending on the embodiment, be a distinct system component, or be incorporated into a traffic manager 221, arbitrator 215, and/or other components of system 200.

A garbage collector monitors and frees buffer space that is no longer being utilized. A garbage collector may utilize techniques described herein, as well as potentially other techniques, to perform this function.

6.12. Miscellaneous

System 200 illustrates only one of many possible arrangements of components configured to provide the functionality described herein. Other arrangements may include fewer, additional, or different components, and the division of work between the components may vary depending on the arrangement. For instance, in an embodiment, an ingress processor 220a is omitted and data units 205 are released directly to a traffic manager 221. As another example, there may be any number of traffic managers 221, each with its own set of queues 224 and coupled to its own set of one or more egress processors 220b. In an embodiment, a device may be composed of multiple elements 215, 220, and 221. For instance, multiple ingress processors 220a may connect to multiple traffic managers 221, with each traffic manager 221 connected to one or more egress packet processors 220b.

7.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, FPGAs, or other circuitry with custom programming to accomplish the techniques.

Though certain foregoing techniques are described with respect to a hardware implementation, which provides a number of advantages in certain embodiments, it will also be recognized that, in other embodiments, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 9:
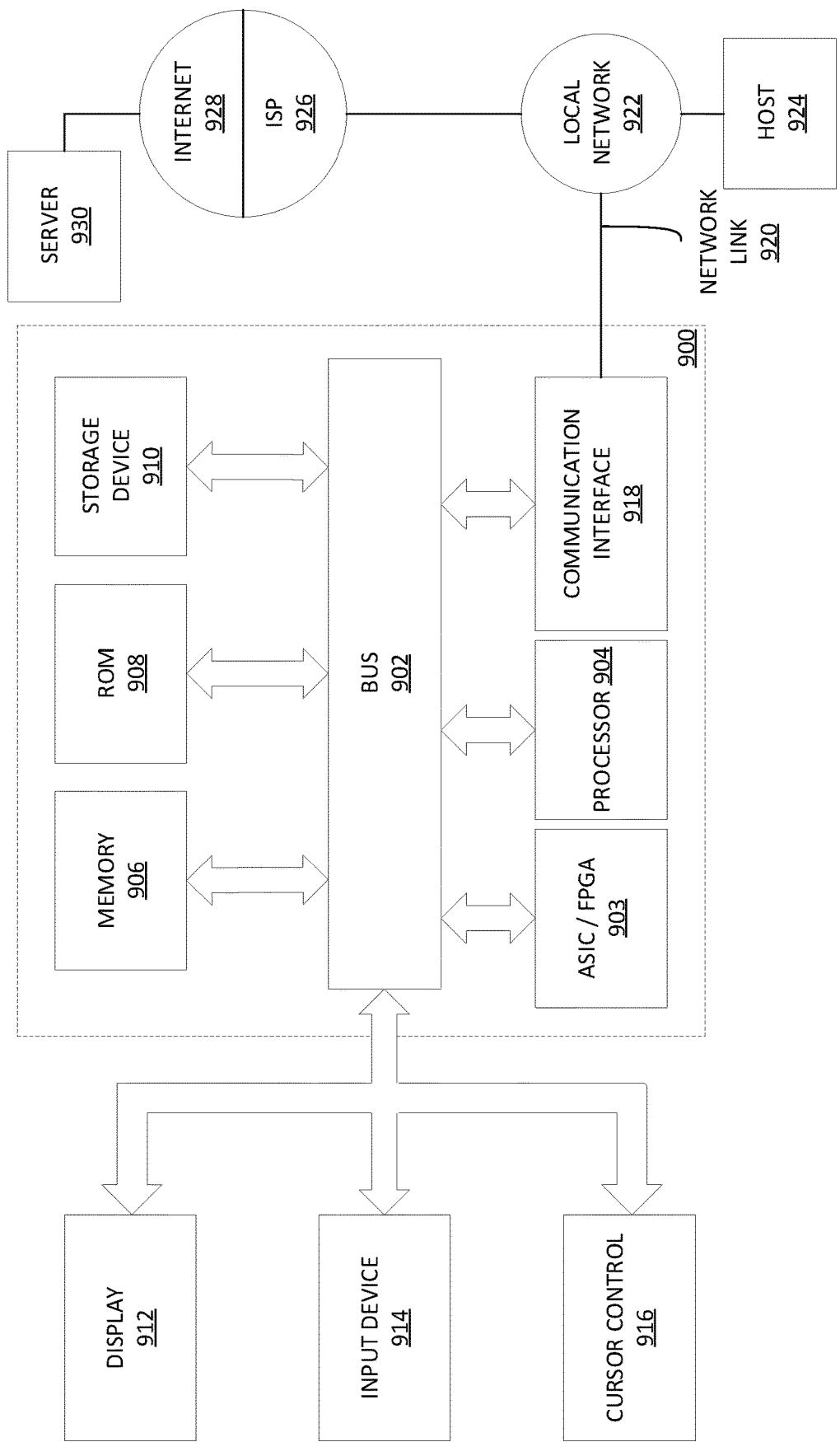
FIG. 9 is block diagram of a computer system upon which embodiments of the inventive subject matter may be implemented.

FIG. 9 is a block diagram that illustrates a computer system 900 that may be utilized in implementing the above-described techniques, according to an embodiment. Computer system 900 may be, for example, a desktop computing device, laptop computing device, tablet, smartphone, server appliance, computing mainframe, multimedia device, handheld device, networking apparatus, or any other suitable device. In an embodiment, FIG. 9 and FIG. 3 are both different views of a same networking device.

Computer system 900 may include one or more ASICs, FPGAs, or other specialized circuitry 903 for implementing program logic as described herein. For example, circuitry 903 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 900 may include one or more hardware processors 904 configured to execute software-based instructions. Computer system 900 may also include one or more busses 902 or other communication mechanism for communicating information. Busses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes one or more memories 906, such as a RAM, hardware registers, or other dynamic or volatile storage device for storing data units to be processed by the one or more ASICs, FPGAs, or other specialized circuitry 903. Memory 906 may also or instead be used for storing information and instructions to be executed by processor 904. Memory 906 may be directly connected or embedded within circuitry 903 or a processor 904. Or, memory 906 may be coupled to and accessed via bus 902. Memory 906 also may be used for storing temporary variables, data units describing rules or policies, or other intermediate information during execution of program logic or instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, may optionally be provided and coupled to bus 902 for storing information and instructions.

A computer system 900 may also include, in an embodiment, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 902.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an embodiment, computer system 900 can send packets and receive data through the network(s), network link 920, and communication interface 918. In some embodiments, this data may be data units that the computer system 900 has been asked to process and, if necessary, redirect to other computer systems via a suitable network link 920. In other embodiments, this data may be instructions for implementing various processes related to the described techniques. For instance, in the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

Computer system 900 may optionally be coupled via bus 902 to one or more displays 912 for presenting information to a computer user. For instance, computer system 900 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 912.

One or more input devices 914 are optionally coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an embodiment, a network-based input device 914 may be utilized. In such an embodiment, user input and/or other information or commands may be relayed via routers and/or switches on a Local Area Network (LAN) or other suitable shared network, or via a peer-to-peer network, from the input device 914 to a network link 920 on the computer system 900.

As discussed, computer system 900 may implement techniques described herein using customized hard-wired logic, one or more ASICs or FPGAs 903, firmware and/or program logic, which in combination with the computer system causes or programs computer system 900 to be a special-purpose machine. According to one embodiment, however, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

8.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended by the applicants to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
    buffer memory banks configured to temporarily buffer data units received over a plurality of network interfaces;
    a traffic manager configured to select particular entries in particular buffer memory banks in which to store particular portions of the data units, the traffic manager further configured to write linking data that defines chains of entries within the buffer memory banks, each chain linking all of the entries in a single buffer memory bank that store data belonging to a same data unit;
    a garbage collector configured to free previously utilized entries in the buffer memory banks for use in storing data for newly received data units;
    one or more memories storing garbage collection lists for the buffer memory banks, each of the buffer memory banks having a different garbage collection list;
    wherein the garbage collector is configured to free previously utilized entries in part by gradually traversing particular chains of entries and freeing traversed entries, the garbage collection lists indicating to the garbage collector starting addresses of the particular chains;
    wherein the traffic manager is further configured to, in response to a determination to dispose of a given data unit, for each given buffer memory bank in at least a set of the buffer memory banks, write, to the given buffer memory bank's garbage collection list, data indicating a starting address of a chain of entries that store data for the given data unit in the given buffer memory bank.

2. The system of claim 1, wherein the traffic manager is further configured to, in response to the determination to dispose of the given data unit, for each given buffer memory bank in the set of the buffer memory banks, immediately free a tail entry at the tail of the chain of entries that store data for the given data unit in the given buffer memory bank.

3. The system of claim 1, wherein the linking data is stored in link memories, each buffer memory bank having a separate link memory for storing linking data specific to that buffer memory bank, each link memory accessible only a limited number of times in a given time period, the garbage collector configured to access the link memory for a given buffer memory bank to identify a next entry in a given chain within that given buffer memory bank only at a time when that link memory is not being accessed by other components of the system.

4. The system of claim 1, further comprising:
    one or more memories storing free lists identifying entries within the buffer memory banks that are available to store data for new data units, each of the buffer memory banks having a different free list;
    wherein the traffic manager is configured to select the particular entries in which to store the particular portions using the free lists, the traffic manager removing the particular entries from the free lists once the particular entries are selected to store the particular portions;
    wherein freeing a buffer entry comprises adding the buffer entry to the free list of the buffer memory bank in which the buffer entry is found.

5. The system of claim 1, wherein the determination to dispose of the given data unit is a decision to drop the given data unit without sending the given data unit to a destination identified by the given data unit.

6. The system of claim 1, wherein the garbage collector is configured to gradually free the particular chains by, iteratively, freeing starting entries at the starting addresses identified by the garbage collection lists, reading particular linking data associated with the starting addresses to identify addresses of next entries in the particular chains, and replacing the starting addresses with the addresses of the next entries in the particular chains until no further entries in the particular chains are left to be freed.

7. The system of claim 1, further comprising:
    one or more memories storing buffer counters corresponding to logical entities, the buffer counters indicating amounts of buffer space in the buffer memory banks consumed by non-freeable data associated with the corresponding logical entities;
    wherein the traffic manager is configured to store one or more entity identifiers associated with the given data unit in association with each starting address for the given data unit in the garbage collection lists;
    wherein the garbage collector is configured to decrement one or more of the buffer counters associated with the one or more entity identifiers when freeing each entry of each of the chains that store data for the given data unit.

8. The system of claim 1, further comprising:
    one or more memories configured to store receive contexts, each of the receive contexts comprising metadata for a different specific data unit whose portions are currently being received, the metadata including, for each buffer memory bank in which at least one portion of the specific data unit is found, at least a head address and a tail address for a chain of entries within the buffer memory bank that stores data for the specific data unit;
    wherein the traffic manager is further configured the generate and update the receive contexts;
    wherein the traffic manager is further configured to, for each given buffer memory bank in the set of the buffer memory banks, copy the head address of the chain of entries the store data for the given data unit within the given buffer memory bank from a given receive context for the given data unit to the given buffer memory bank's garbage collection list.

9. The system of claim 1, further comprising one or more packet processors configured to utilize the linking data to determine correct orders in which to send or process the particular portions of the data units.

10. The system of claim 1, wherein the determination to dispose of the given data unit is made prior to receiving at least one portion of the given data unit.

11. A method comprising:
receiving data units over a plurality of network interfaces;
temporarily buffering the received data units in buffer memory banks;
selecting particular entries in particular buffer memory banks in which to store particular portions of a particular data unit;
writing linking data that defines chains of entries within the particular buffer memory banks, each chain linking, for a different buffer memory bank of the buffer memory banks, all of the entries in that buffer memory bank that store data belonging to the particular data unit;
storing garbage collection lists for the buffer memory banks, each of the buffer memory banks having a different garbage collection list;
in response to a determination to dispose of the particular data unit, for each given buffer memory bank in at least a set of the buffer memory banks, writing, to the given buffer memory bank's garbage collection list, data indicating a starting address of a chain of entries that store data for the particular data unit in the given buffer memory bank;
for each given buffer memory bank in the set of the buffer memory banks, based on the given buffer memory bank's garbage collection list and on the linking data for the given buffer memory bank, incrementally traversing certain entries in the chain of entries that store data for the particular data unit in the given buffer memory bank and freeing the certain entries as the certain entries are traversed.

12. The method of claim 11, wherein incrementally traversing and freeing comprises: iteratively reading the starting address from the garbage collection list of the given buffer memory bank, adding the starting address to a list of freeable entries for the given buffer memory bank, reading particular linking data associated with the starting address to identify a next address in the chain of entries that store data for the particular data unit in the given buffer memory bank, and updating the starting address to be the next address, until no further entries in the chain are left to be freed.

13. The method of claim 11, further comprising, in response to the determination to dispose of the particular data unit, for each given buffer memory bank in the set of the buffer memory banks, immediately freeing a tail entry at the tail of the chain of entries that store data for the particular data unit in the given buffer memory bank.

14. The method of claim 11, wherein the linking data is stored in link memories, each buffer memory bank having a separate link memory for storing linking data specific to that buffer memory bank, each link memory accessible only a limited number of times in a given time period, wherein incrementally traversing comprises, only at times when the link memory of the given buffer memory bank is not locked for access for other operations, accessing the link memory to identify next entries in the chain of entries that store data for the particular data unit within the given buffer memory bank.

15. The method of claim 11, further comprising:
storing free lists identifying entries within the buffer memory banks that are available to store data for new data units, each of the buffer memory banks having a different free list;
selecting the particular entries in which to store the particular portions using the free lists, the traffic manager removing the particular entries from the free lists once the particular entries are selected to store the particular portions;
wherein freeing a buffer entry comprises adding the buffer entry to the free list of the buffer memory bank in which the buffer entry is found.

16. The method of claim 11, wherein the determination to dispose of the particular data unit is a decision to drop the particular data unit without sending the particular data unit to a destination identified by the particular data unit.

17. The method of claim 11, further comprising:
storing buffer counters corresponding to logical entities, the buffer counters indicating amounts of buffer space in the buffer memory banks consumed by non-freeable data associated with the corresponding logical entities;
storing one or more entity identifiers associated with the particular data unit in association with each starting address for the particular data unit in the garbage collection lists;
decrementing one or more of the buffer counters associated with the one or more entity identifiers when freeing each entry of each of the chains that store data for the particular data unit.

18. The method of claim 11, further comprising:
storing a receive context comprising metadata for the particular data unit as the particular data unit is being received, the metadata including, for each buffer memory bank in which at least one portion of the particular data unit is found, at least a head address and a tail address for a chain of entries within the buffer memory bank that stores data for the particular data unit;
for each given buffer memory bank in the set of the buffer memory banks, copying the head address of the chain of entries that store data for the particular data unit within the given buffer memory bank from a given receive context for the particular data unit to the given buffer memory bank's garbage collection list.

19. The method of claim 11, wherein the determination to dispose of the particular data unit is made prior to buffering at least one portion of the particular data unit.

20. One or more non-transitory computer-readable media storing instructions that, when executed by one or more computing devices, cause performance of:
receiving data units over a plurality of network interfaces;
temporarily buffering the received data units in memory buffer memory banks;
selecting particular entries in particular buffer memory banks in which to store particular portions of a particular data unit;
writing linking data that defines chains of entries within the particular buffer memory banks, each chain linking, for a different buffer memory bank of the buffer memory banks, all of the entries in that buffer memory bank that store data belonging to the particular data unit;
storing garbage collection lists for the buffer memory banks, each of the buffer memory banks having a different garbage collection list;
in response to a determination to dispose of the particular data unit, for each given buffer memory bank in at least a set of the buffer memory banks, writing, to the given buffer memory bank's garbage collection list, data indicating a starting address of a chain of entries that store data for the particular data unit in the given buffer memory bank;
for each given buffer memory bank in the set of the buffer memory banks, based on the given buffer memory bank's garbage collection list and on the linking data for the given buffer memory bank, incrementally traversing certain entries in the chain of entries that store data for the particular data unit in the given buffer memory bank and freeing the certain entries as the certain entries are traversed.

* * * * *

UNITED STATES PATENT AND TRADEMARK OFFICE
CERTIFICATE OF CORRECTION

PATENT NO. : 10,523,576 B1
APPLICATION NO. : 16/029441
DATED : December 31, 2019
INVENTOR(S) : Matthews et al.

Page 1 of 1

It is certified that error appears in the above-identified patent and that said Letters Patent is hereby corrected as shown below:

In the Claims

Column 44
Claim 8: Line 57: Delete "the store" and insert --that store--

Signed and Sealed this
Fourth Day of February, 2020

Andrei Iancu
*Director of the United States Patent and Trademark Office*